(12) United States Patent
Ie

(10) Patent No.: US 7,914,403 B2
(45) Date of Patent: Mar. 29, 2011

(54) HOCKEY STICK

(75) Inventor: Citra A. Ie, San Diego, CA (US)

(73) Assignee: Easton Sports, Inc., Van Nuys, CA (US)

( * ) Notice: Subject to any disclaimer, the term of this patent is extended or adjusted under 35 U.S.C. 154(b) by 0 days.

(21) Appl. No.: 12/221,913

(22) Filed: Aug. 6, 2008

(65) Prior Publication Data

US 2010/0035708 A1    Feb. 11, 2010

(51) Int. Cl.
A63B 59/14    (2006.01)

(52) U.S. Cl. .................................................... 473/563

(58) Field of Classification Search ............... 473/446, 473/437, 560–563
See application file for complete search history.

(56) References Cited

U.S. PATENT DOCUMENTS

| | | |
|---|---|---|
| 1,601,116 A | 9/1926 | Hall |
| 2,023,728 A | 12/1935 | Charles |
| 2,201,706 A | 5/1940 | Sukohi |
| 2,304,322 A | 12/1942 | Werlich |
| 2,649,133 A | 8/1953 | Just |
| 2,674,557 A | 4/1954 | Boggs |
| 2,762,739 A | 9/1956 | Weiss |
| 2,774,596 A | 12/1956 | Bredenberg |
| 2,912,245 A | 11/1959 | Gardner et al. |
| 2,964,065 A | 12/1960 | Haroldson |
| 3,020,192 A | 2/1962 | Stephens et al. |
| 3,125,478 A | 3/1964 | Pratt |
| 3,353,826 A | 11/1967 | Traverse |
| 3,387,348 A | 6/1968 | Kilgallon |
| 3,489,412 A | 1/1970 | Franck et al. |
| 3,533,623 A | 10/1970 | Dumont |
| 3,544,104 A | 12/1970 | Jenks |
| 3,561,760 A | 2/1971 | Klay |
| 3,563,546 A * | 2/1971 | Dawe ........................... 473/563 |
| 3,606,326 A | 9/1971 | Sparks et al. |
| 3,631,897 A | 1/1972 | Fischer et al. |
| 3,638,942 A | 2/1972 | Bassett |
| 3,720,410 A | 3/1973 | Saytar |
| 3,727,936 A | 4/1973 | Klir et al. |
| 3,809,401 A | 5/1974 | Hankele |
| 3,813,098 A | 5/1974 | Fischer et al. |
| 3,851,880 A | 12/1974 | Ritch |
| 3,859,162 A | 1/1975 | Johnson et al. |
| 3,910,578 A | 10/1975 | Brine, Jr. |
| 3,934,875 A | 1/1976 | Easton et al. |

(Continued)

FOREIGN PATENT DOCUMENTS

CA    489072    12/1952

(Continued)

OTHER PUBLICATIONS

International Search Report PCT/US2009?053053, Sep. 23, 2009.

(Continued)

*Primary Examiner* — Mark S Graham
(74) *Attorney, Agent, or Firm* — Orrick, Herrington & Sutcliffe

(57) ABSTRACT

A composite hockey stick having a tubular hollow shaft and a blade is disclosed. The shaft includes a region of focused weight in the form of an overlay coating that is applied on top if the internal surfaces of the cured shaft using a coating plug. The blade includes a focused weight region that is inserted into a cavity within the cured composite blade. Methods and suitable materials for constructions of the various components of the blade and shaft are also disclosed.

18 Claims, 11 Drawing Sheets

U.S. PATENT DOCUMENTS

| | | | |
|---|---|---|---|
| 3,961,790 A | 6/1976 | Milligan | |
| 3,970,324 A | 7/1976 | Howat | |
| 3,982,760 A | 9/1976 | Titola | |
| 4,013,288 A | 3/1977 | Goverde | |
| 4,013,810 A | 3/1977 | Long | |
| 4,016,640 A | 4/1977 | Briggs | |
| D244,790 S | 6/1977 | Carlson et al. | |
| 4,052,061 A * | 10/1977 | Stewart | 473/437 |
| 4,052,499 A | 10/1977 | Goupil et al. | |
| 4,059,269 A | 11/1977 | Tiitola | |
| 4,061,520 A | 12/1977 | Cecka et al. | |
| 4,070,020 A | 1/1978 | Dano | |
| 4,070,021 A | 1/1978 | Cecka et al. | |
| 4,076,240 A | 2/1978 | Haddad | |
| 4,084,818 A | 4/1978 | Goupil et al. | |
| 4,086,115 A | 4/1978 | Sweet, Jr. et al. | |
| 4,124,208 A | 11/1978 | Burns | |
| 4,124,670 A | 11/1978 | Cecka et al. | |
| 4,128,963 A | 12/1978 | Dano | |
| 4,129,634 A | 12/1978 | Cecka et al. | |
| 4,134,198 A | 1/1979 | Briggs | |
| 4,134,587 A | 1/1979 | Diederich | |
| 4,148,482 A | 4/1979 | Harwell, Jr. et al. | |
| 4,159,114 A | 6/1979 | Ardell et al. | |
| 4,172,594 A | 10/1979 | Diederich | |
| 4,180,413 A | 12/1979 | Diederich | |
| 4,200,479 A | 4/1980 | Ardell et al. | |
| 4,212,461 A | 7/1980 | Cecka et al. | |
| 4,239,215 A | 12/1980 | Farr | |
| 4,241,115 A | 12/1980 | Temin | |
| 4,273,601 A | 6/1981 | Weingart | |
| 4,320,160 A | 3/1982 | Nishimura et al. | |
| 4,343,468 A | 8/1982 | Lindgren | |
| 4,351,528 A | 9/1982 | Duplin | |
| 4,353,549 A | 10/1982 | Goupil et al. | |
| 4,358,113 A | 11/1982 | McKinnon et al. | |
| 4,358,117 A | 11/1982 | Deutsch | |
| 4,361,325 A | 11/1982 | Jansen | |
| 4,369,970 A | 1/1983 | Salminen | |
| 4,461,479 A | 7/1984 | Mitchell | |
| 4,488,721 A | 12/1984 | Franck et al. | |
| 4,504,344 A | 3/1985 | Helle et al. | |
| 4,512,573 A | 4/1985 | Coolen | |
| 4,520,042 A | 5/1985 | Smith | |
| 4,537,398 A | 8/1985 | Salminen | |
| 4,570,932 A | 2/1986 | Cote | |
| 4,579,617 A | 4/1986 | Öberg et al. | |
| 4,591,155 A | 5/1986 | Adachi | |
| 4,600,192 A | 7/1986 | Adachi | |
| 4,651,990 A | 3/1987 | Profit | |
| 4,660,832 A | 4/1987 | Shomo | |
| 4,664,379 A | 5/1987 | Melby | |
| 4,684,130 A | 8/1987 | Drolet et al. | |
| 4,739,994 A | 4/1988 | Lewis, Jr. | |
| 4,765,856 A | 8/1988 | Doubt | |
| 4,770,915 A | 9/1988 | Nakagawa et al. | |
| 4,793,616 A | 12/1988 | Fernandez | |
| 4,799,985 A | 1/1989 | McMahon et al. | |
| 4,818,318 A | 4/1989 | McMahon et al. | |
| 4,871,491 A | 10/1989 | McMahon et al. | |
| 4,874,563 A | 10/1989 | McMahon et al. | |
| 4,923,541 A | 5/1990 | Burger | |
| 4,968,032 A | 11/1990 | Redekop | |
| 4,979,743 A | 12/1990 | Sears | |
| 5,005,254 A | 4/1991 | Uffindell | |
| 5,024,712 A | 6/1991 | Lecourt et al. | |
| 5,042,804 A | 8/1991 | Uke et al. | |
| 5,042,805 A | 8/1991 | Nakai | |
| 5,048,441 A | 9/1991 | Quigley | |
| 5,050,289 A | 9/1991 | Uffindell | |
| 5,050,878 A | 9/1991 | Deleris | |
| 5,067,726 A | 11/1991 | Brine, III et al. | |
| 5,076,872 A | 12/1991 | Nakagawa et al. | |
| 5,078,396 A | 1/1992 | Cavallaro et al. | |
| 5,127,649 A | 7/1992 | Cabeonero | |
| D329,888 S | 9/1992 | Christian | |
| 5,160,135 A | 11/1992 | Hasegawa | |
| 5,174,567 A | 12/1992 | Nordstrom | |
| 5,183,264 A | 2/1993 | Lanctot | |
| 5,188,872 A | 2/1993 | Quigley | |
| 5,206,085 A | 4/1993 | Nakagawa et al. | |
| 5,217,221 A | 6/1993 | Baum | |
| 5,242,637 A | 9/1993 | Inoue et al. | |
| 5,261,662 A | 11/1993 | Prevost | |
| 5,303,916 A | 4/1994 | Rodgers | |
| 5,306,003 A | 4/1994 | Pagotto | |
| 5,312,100 A | 5/1994 | Ilacqua et al. | |
| 5,332,212 A | 7/1994 | Susi et al. | |
| 5,333,857 A | 8/1994 | Lallemand | |
| 5,364,693 A | 11/1994 | Moren et al. | |
| 5,373,616 A | 12/1994 | Biersdorf et al. | |
| 5,380,002 A | 1/1995 | Spector | |
| 5,407,195 A | 4/1995 | Tiitola et al. | |
| 5,419,553 A | 5/1995 | Rodgers | |
| 5,423,531 A | 6/1995 | Hoshizaki et al. | |
| 5,423,735 A | 6/1995 | Callinan et al. | |
| 5,429,352 A | 7/1995 | Leclerc | |
| 5,435,548 A | 7/1995 | Leduke et al. | |
| 5,439,215 A | 8/1995 | Ratchford | |
| 5,456,463 A | 10/1995 | Dolan et al. | |
| 5,458,330 A | 10/1995 | Baum | |
| RE35,081 E | 11/1995 | Quigley | |
| 5,470,067 A | 11/1995 | Diresta | |
| 5,492,425 A | 2/1996 | Carter et al. | |
| 5,496,027 A | 3/1996 | Christian et al. | |
| 5,511,776 A | 4/1996 | Huru | |
| 5,520,385 A | 5/1996 | Quigley et al. | |
| 5,524,884 A | 6/1996 | Haines | |
| 5,533,723 A | 7/1996 | Baum | |
| 5,549,947 A | 8/1996 | Quigley et al. | |
| 5,556,677 A | 9/1996 | Quigley et al. | |
| 5,558,326 A | 9/1996 | Adamson et al. | |
| 5,577,725 A | 11/1996 | Pagotto et al. | |
| 5,582,405 A | 12/1996 | Montgomery | |
| 5,582,406 A | 12/1996 | Babcock | |
| 5,593,158 A | 1/1997 | Filice | |
| 5,599,242 A | 2/1997 | Solviche et al. | |
| 5,603,498 A | 2/1997 | Crawford et al. | |
| 5,605,327 A | 2/1997 | McCutchen | |
| 5,607,154 A | 3/1997 | Meumann et al. | |
| 5,607,226 A | 3/1997 | Toth et al. | |
| 5,624,115 A | 4/1997 | Baum | |
| 5,628,509 A | 5/1997 | Christian | |
| 5,633,299 A | 5/1997 | Van Druten et al. | |
| 5,636,836 A | 6/1997 | Carroll et al. | |
| 5,653,468 A | 8/1997 | Ostapyk | |
| 5,653,643 A | 8/1997 | Falone et al. | |
| 5,655,981 A | 8/1997 | Reed | |
| 5,674,141 A | 10/1997 | Laforest | |
| 5,676,608 A | 10/1997 | Christian et al. | |
| 5,685,791 A | 11/1997 | Feeney | |
| 5,685,792 A | 11/1997 | Ruoff | |
| 5,688,571 A | 11/1997 | Quigley et al. | |
| 5,690,850 A | 11/1997 | Anderson | |
| 5,695,416 A | 12/1997 | Christian | |
| 5,697,857 A | 12/1997 | Christian et al. | |
| 5,700,533 A | 12/1997 | You | |
| 5,718,647 A | 2/1998 | Tiitola | |
| 5,728,008 A | 3/1998 | Howard | |
| 5,728,016 A | 3/1998 | Hsu | |
| 5,744,528 A | 4/1998 | Callinan et al. | |
| 5,746,955 A | 5/1998 | Calapp et al. | |
| 5,772,541 A | 6/1998 | Buiatti | |
| 5,816,949 A | 10/1998 | Dutchburn | |
| 5,816,962 A | 10/1998 | Etersque | |
| 5,816,963 A | 10/1998 | Brooks et al. | |
| 5,823,901 A | 10/1998 | Burger | |
| 5,827,141 A | 10/1998 | Lukey et al. | |
| 5,839,977 A | 11/1998 | Maurer et al. | |
| D404,449 S | 1/1999 | Burger | |
| 5,863,268 A | 1/1999 | Birch | |
| 5,863,269 A | 1/1999 | Filice | |
| 5,865,694 A | 2/1999 | Duong-Van | |
| 5,865,696 A | 2/1999 | Calapp et al. | |
| 5,866,051 A | 2/1999 | Lin et al. | |
| 5,879,250 A | 3/1999 | Tahtinen et al. | |
| 5,888,601 A | 3/1999 | Quigley et al. | |

| | | | | | | |
|---|---|---|---|---|---|---|
| 5,904,873 | A | 5/1999 | Sadler et al. | 7,553,239 B2 * | 6/2009 | Pullaro ............... 473/256 |
| 5,928,090 | A | 7/1999 | Cabales et al. | 7,789,778 B2 | 9/2010 | Goldsmith et al. |
| D412,544 | S | 8/1999 | Burger | 2001/0018378 A1 | 8/2001 | Burger |
| 5,935,027 | A | 8/1999 | Nashif et al. | 2001/0029813 A1 | 10/2001 | Schroder |
| 5,943,767 | A | 8/1999 | Milam | 2001/0041633 A1 | 11/2001 | Tiitola |
| 5,944,617 | A | 8/1999 | Falone et al. | 2001/0046909 A1 | 11/2001 | Pagotto |
| 5,967,913 | A | 10/1999 | Sulenta | 2001/0046910 A1 | 11/2001 | Sutherland |
| 5,979,288 | A | 11/1999 | Gallagher et al. | 2002/0007022 A1 | 1/2002 | Oosedo et al. |
| 5,980,404 | A | 11/1999 | Gentile | 2002/0061374 A1 | 5/2002 | O'Brien |
| 5,980,674 | A | 11/1999 | Burger | 2002/0073620 A1 | 6/2002 | Lank |
| 5,997,970 | A | 12/1999 | You | 2002/0094891 A1 | 7/2002 | Horwood et al. |
| 6,001,035 | A | 12/1999 | Roberts | 2002/0098924 A1 | 7/2002 | Houser et al. |
| 6,004,900 | A | 12/1999 | O'Brien, III | 2002/0107095 A1 | 8/2002 | Becker |
| 6,019,691 | A | 2/2000 | Hilborn | 2002/0128093 A1 | 9/2002 | Whayne |
| 6,033,326 | A | 3/2000 | Lee | 2002/0166595 A1 | 11/2002 | Lindsay |
| 6,033,327 | A | 3/2000 | Bird | 2002/0177497 A1 | 11/2002 | Westerlund |
| 6,033,328 | A | 3/2000 | Bellefleur et al. | 2002/0198071 A1 | 12/2002 | Snow |
| 6,036,610 | A | 3/2000 | Lewark | 2003/0004019 A1 | 1/2003 | Lussier et al. |
| 6,039,661 | A | 3/2000 | Christian et al. | 2003/0008734 A1 | 1/2003 | Tiitola |
| 6,042,485 | A | 3/2000 | Cheng | 2003/0045380 A1 | 3/2003 | Tucker |
| 6,045,906 | A | 4/2000 | McMahon et al. | 2003/0084756 A1 | 5/2003 | Schroder et al. |
| 6,062,988 | A | 5/2000 | Yamamoto | 2003/0100390 A1 | 5/2003 | Bellefleur et al. |
| 6,062,995 | A | 5/2000 | Murphy et al. | 2003/0104152 A1 | 6/2003 | Sommer |
| 6,062,996 | A * | 5/2000 | Quigley et al. ............... 473/563 | 2003/0123917 A1 | 7/2003 | Willat et al. |
| 6,063,839 | A | 5/2000 | Oosedo et al. | 2003/0144071 A1 | 7/2003 | Dodge et al. |
| D430,249 | S | 8/2000 | Burger | 2003/0148836 A1 | 8/2003 | Falone et al. |
| 6,102,819 | A | 8/2000 | Christian et al. | 2003/0216197 A1 * | 11/2003 | LeMire et al. ............... 473/562 |
| D431,273 | S | 9/2000 | Burger | 2004/0102263 A1 | 5/2004 | Blotteaux |
| 6,113,508 | A | 9/2000 | Locarno et al. | 2004/0127310 A1 | 7/2004 | Hsu |
| 6,117,029 | A | 9/2000 | Kunisaki et al. | 2005/0070382 A1 * | 3/2005 | Loschiavo ............... 473/563 |
| 6,129,962 | A | 10/2000 | Quigley et al. | 2005/0090339 A1 | 4/2005 | Gans et al. |
| 6,152,840 | A | 11/2000 | Baum | 2005/0187045 A1 | 8/2005 | Berghash |
| 6,155,932 | A | 12/2000 | Cabales et al. | 2005/0215365 A1 | 9/2005 | Lussier et al. |
| 6,176,640 | B1 | 1/2001 | Gonczi | 2007/0155548 A1 * | 7/2007 | Goldsmith et al. ............ 473/562 |
| 6,183,384 | B1 | 2/2001 | Roberto | 2008/0093765 A1 | 4/2008 | Sartor et al. |
| 6,197,392 | B1 | 3/2001 | Jones | 2008/0127721 A1 | 6/2008 | Shields et al. |
| 6,203,447 | B1 | 3/2001 | Dillard | 2009/0011876 A1 * | 1/2009 | Mollner et al. ............... 473/563 |
| 6,203,454 | B1 | 3/2001 | Nashif et al. | 2009/0054180 A1 | 2/2009 | Garcia |
| 6,206,793 | B1 | 3/2001 | Burger | | | |
| D440,617 | S | 4/2001 | Goldsmith | FOREIGN PATENT DOCUMENTS | | |
| 6,224,505 | B1 | 5/2001 | Burger | CA | 557838 | 5/1958 |
| 6,234,923 | B1 | 5/2001 | Gentile | CA | 633295 | 12/1961 |
| 6,241,633 | B1 | 6/2001 | Conroy | CA | 903285 | 6/1972 |
| 6,248,031 | B1 | 6/2001 | Brodie | CA | 1043065 | 11/1978 |
| 6,250,193 | B1 | 6/2001 | Head | CA | 1043379 | 11/1978 |
| 6,254,502 | B1 * | 7/2001 | Becker ............ 473/594 | CA | 1047561 | 1/1979 |
| 6,257,997 | B1 | 7/2001 | Doble et al. | CA | 1063747 | 10/1979 |
| 6,265,475 | B1 | 7/2001 | Chifei et al. | CA | 1069147 | 1/1980 |
| 6,267,697 | B1 | 7/2001 | Sulenta | CA | 1072142 | 2/1980 |
| 6,273,829 | B1 | 8/2001 | Carlson | CA | 1138912 | 1/1983 |
| 6,273,835 | B1 | 8/2001 | Battis et al. | CA | 1145371 | 1/1983 |
| 6,274,230 | B1 | 8/2001 | Sarrelongue et al. | CA | 1147767 | 6/1983 |
| 6,306,474 | B1 | 10/2001 | Yoshioka et al. | CA | 1151693 | 8/1983 |
| 6,352,485 | B1 | 3/2002 | Philpot et al. | CA | 1180728 | 1/1985 |
| 6,358,166 | B1 | 3/2002 | Yu | CA | 1183883 | 3/1985 |
| 6,364,792 | B1 | 4/2002 | Evanochko | CA | 1187525 | 5/1985 |
| 6,364,793 | B1 | 4/2002 | Valarik | CA | 1205835 | 6/1986 |
| 6,395,210 | B1 | 5/2002 | Head et al. | CA | 1206309 | 6/1986 |
| D458,329 | S | 6/2002 | Clark et al. | CA | 1206497 | 6/1986 |
| 6,399,199 | B1 | 6/2002 | Fujino et al. | CA | 1207350 | 7/1986 |
| 6,403,504 | B1 | 6/2002 | McMahon et al. | CA | 1219886 | 3/1987 |
| 6,500,079 | B1 | 12/2002 | Tucker | CA | 1230898 | 12/1987 |
| 6,515,081 | B2 | 2/2003 | Oosedo et al. | CA | 2071859 A1 | 6/1991 |
| 6,525,125 | B1 | 2/2003 | Giardello et al. | CA | 2029109 A1 | 2/1992 |
| 6,565,280 | B1 | 5/2003 | Post | CA | 2037273 A1 | 8/1992 |
| 6,610,382 | B1 | 8/2003 | Kobe et al. | CA | 2066476 A1 | 10/1992 |
| 6,612,944 | B1 | 9/2003 | Bureau | CA | 1310674 | 11/1992 |
| 6,625,848 | B1 | 9/2003 | Schneider | CA | 2071022 A1 | 12/1992 |
| 6,626,775 | B2 | 9/2003 | Tiitola | CA | 2099853 A1 | 7/1993 |
| 6,918,847 | B2 * | 7/2005 | Gans et al. ............ 473/563 | CA | 2062635 A1 | 9/1993 |
| 7,008,338 | B2 | 3/2006 | Pearson | CA | 2067087 A1 | 10/1993 |
| 7,044,870 | B2 | 5/2006 | Pagotto | CA | 2105797 A1 | 11/1993 |
| 7,070,524 | B1 * | 7/2006 | Garvey, III ............ 473/519 | CA | 1328892 | 4/1994 |
| 7,097,577 | B2 | 8/2006 | Goldsmith et al. | CA | 2081439 A1 | 4/1994 |
| 7,144,343 | B2 | 12/2006 | Goldsmith et al. | CA | 2086470 | 4/1994 |
| 7,232,386 | B2 | 6/2007 | Halko et al. | CA | 2125343 A1 | 7/1994 |
| 7,326,136 | B2 | 2/2008 | Jean et al. | CA | 2088899 A1 | 8/1994 |
| 7,329,195 | B2 | 2/2008 | Pearson | CA | 2120809 A1 | 10/1994 |
| 7,476,167 | B2 | 1/2009 | Garcia | CA | 2096304 | 11/1994 |

| | | | | | | |
|---|---|---|---|---|---|---|
| CA | 2108069 | A1 | 4/1995 | EP | 0 947 562 A1 | 10/1999 |
| CA | 2132567 | A1 | 7/1995 | EP | 0 970 708 A1 | 1/2000 |
| CA | 2123248 | A1 | 10/1995 | EP | 0 693 944 B1 | 4/2000 |
| CA | 2204021 | A1 | 5/1996 | EP | 1 068 884 A2 | 1/2001 |
| CA | 2169216 | A1 | 8/1996 | EP | 1 086 724 A1 | 3/2001 |
| CA | 2162444 | A1 | 12/1996 | FI | 65018 | 11/1983 |
| CA | 2226670 | A1 | 2/1997 | GB | 637779 | 5/1950 |
| CA | 2160731 | A1 | 4/1997 | GB | 1121051 | 7/1968 |
| CA | 2164188 | A1 | 5/1997 | SE | 169928 | 12/1959 |
| CA | 2200663 | A1 | 9/1997 | WO | WO 82/03789 A1 | 11/1982 |
| CA | 2180893 | A1 | 1/1998 | WO | WO 90/15712 A1 | 12/1990 |
| CA | 2223098 | | 3/1998 | WO | WO 91/08803 A1 | 6/1991 |
| CA | 2190431 | A1 | 5/1998 | WO | WO 91/16955 A1 | 11/1991 |
| CA | 2228104 | A1 | 9/1998 | WO | WO 93/05219 A1 | 3/1993 |
| CA | 2294864 | A1 | 9/1998 | WO | WO 94/21334 A1 | 9/1994 |
| CA | 2202454 | A1 | 10/1998 | WO | WO 94/23768 A1 | 10/1994 |
| CA | 2238291 | A1 | 2/1999 | WO | WO 95/01820 A1 | 1/1995 |
| CA | 2244610 | A1 | 2/1999 | WO | WO 95/24245 A1 | 9/1995 |
| CA | 2262210 | A1 | 8/1999 | WO | WO 96/01137 A1 | 1/1996 |
| CA | 2272497 | A1 | 12/1999 | WO | WO 96/01699 A1 | 1/1996 |
| CA | 2294301 | A1 | 1/2000 | WO | WO 96/02385 A1 | 2/1996 |
| CA | 2310802 | A1 | 2/2001 | WO | WO 96/13549 A2 | 5/1996 |
| CA | 2289988 | A1 | 5/2001 | WO | WO 97/03730 A1 | 2/1997 |
| CA | 2326966 | A1 | 6/2001 | WO | WO 97/03820 A1 | 2/1997 |
| CA | 2329228 | A1 | 6/2001 | WO | WO 97/29808 A1 | 8/1997 |
| CA | 2293950 | A1 | 7/2001 | WO | WO 97/33660 A1 | 9/1997 |
| CA | 2324063 | A1 | 2/2002 | WO | WO 97/41929 A2 | 11/1997 |
| CA | 2357331 | A1 | 3/2002 | WO | WO 98/01189 A1 | 1/1998 |
| CA | 2359410 | A1 | 4/2002 | WO | WO 98/19753 A1 | 5/1998 |
| DE | 376009 | | 12/1921 | WO | WO 98/24616 A1 | 6/1998 |
| DE | 3238117 | | 6/1983 | WO | WO 98/41292 A1 | 9/1998 |
| EP | 0 172 564 | A2 | 2/1986 | WO | WO 98/55182 A2 | 12/1998 |
| EP | 0 172 564 | A3 | 2/1986 | WO | WO 99/17845 A1 | 4/1999 |
| EP | 0 226 420 | A2 | 6/1987 | WO | WO 99/32198 A1 | 7/1999 |
| EP | 0 226 420 | A3 | 6/1987 | WO | WO 99/60030 A1 | 11/1999 |
| EP | 0 226 420 | B1 | 6/1987 | WO | WO 00/03769 A1 | 1/2000 |
| EP | 0 310 203 | A1 | 4/1989 | WO | WO 00/09222 A2 | 2/2000 |
| EP | 0 351 201 | A2 | 1/1990 | WO | WO 00/10655 A1 | 3/2000 |
| EP | 0 407 996 | A2 | 1/1991 | WO | WO 00/27632 A1 | 5/2000 |
| EP | 0 407 996 | A3 | 1/1991 | WO | WO 00/32278 A1 | 6/2000 |
| EP | 0 407 996 | B1 | 1/1991 | WO | WO 00/46255 A1 | 8/2000 |
| EP | 0 441 971 | A1 | 8/1991 | WO | WO 01/14019 A1 | 3/2001 |
| EP | 0 441 971 | B1 | 8/1991 | WO | WO 01/26752 A1 | 4/2001 |
| EP | 0 441 971 | B2 | 8/1991 | WO | WO 01/43838 A1 | 6/2001 |
| EP | 0 487 549 | B1 | 6/1992 | WO | WO 01/47605 A2 | 7/2001 |
| EP | 0 504 230 | B1 | 9/1992 | WO | WO 01/97990 A2 | 12/2001 |
| EP | 0 523 913 | A1 | 1/1993 | WO | WO 02/04078 A1 | 1/2002 |
| EP | 0 532 444 | A1 | 3/1993 | WO | WO 02/13638 A2 | 2/2002 |
| EP | 0 585 965 | A1 | 3/1994 | WO | WO 02/35184 A2 | 5/2002 |
| EP | 0 597 166 | A2 | 5/1994 | WO | WO 02/070080 A1 | 9/2002 |
| EP | 0 597 166 | A3 | 5/1994 | WO | WO 02/089926 A1 | 11/2002 |
| EP | 0 597 166 | B1 | 5/1994 | WO | WO 2005/082470 A1 | 9/2005 |
| EP | 0 662 391 | A2 | 7/1995 | WO | PCT/US2009/053053 | 9/2009 |
| EP | 0 662 391 | A3 | 7/1995 | | | |
| EP | 0 733 469 | A2 | 9/1996 | | | |
| EP | 0 733 469 | A3 | 9/1996 | | | |
| EP | 0 733 469 | B1 | 9/1996 | | | |
| EP | 0 742 266 | A2 | 11/1996 | | | |
| EP | 0 742 266 | A3 | 11/1996 | | | |
| EP | 0 764 453 | A1 | 3/1997 | | | |
| EP | 0 927 628 | A1 | 7/1999 | | | |

OTHER PUBLICATIONS

Polyurethane Foam Association, Joint Industry Foam Standards and Guidelines, Jul. 1994, 5 pages from website.

The Rubber Group Materials, Aug. 31, 2004, 4 pages from website.

* cited by examiner

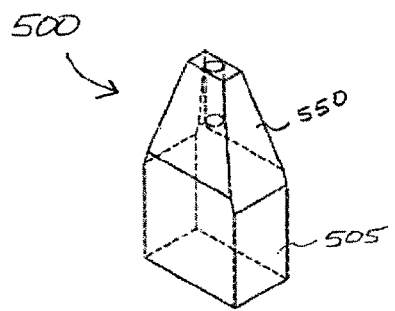
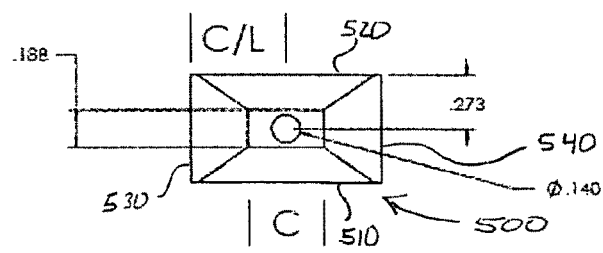
FIG. 4A  FIG. 4B
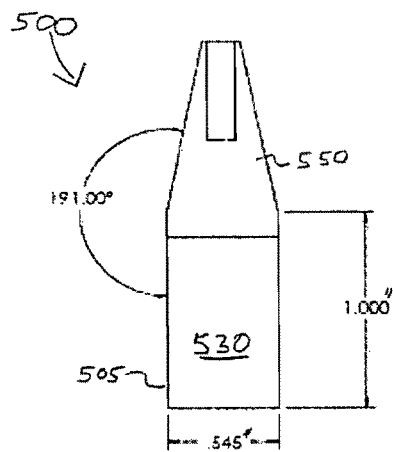
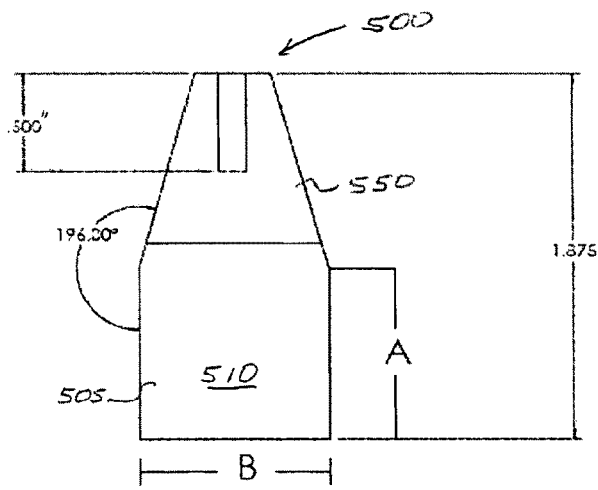
FIG. 4C  FIG. 4D
| A | .875" |
|---|---|
| B | .945" |
| C | .375" |

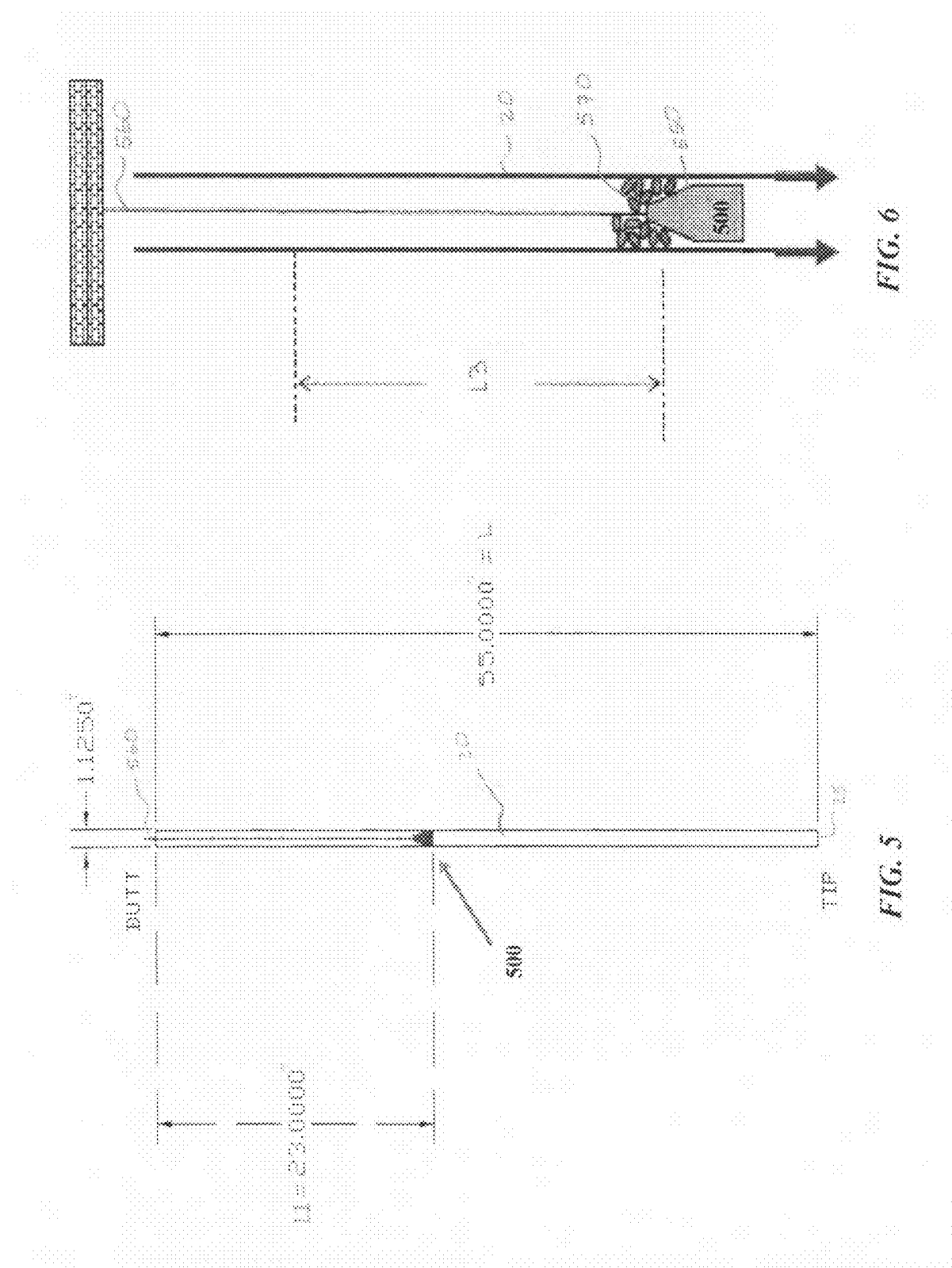

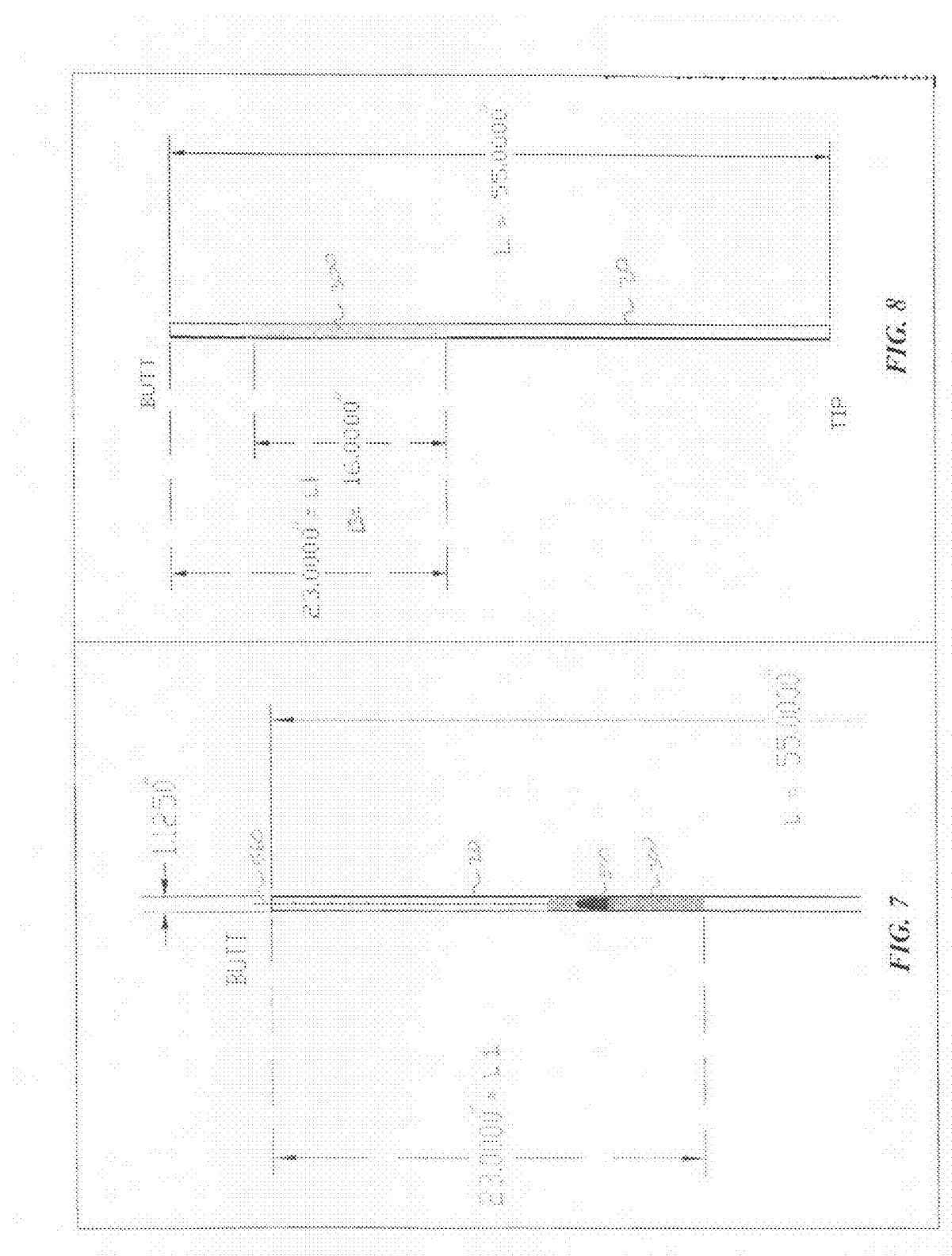

ium sock or other suitable material. A polyurethane
HOCKEY STICK

FIELD OF THE INVENTION

The field of the present invention generally relates to hockey sticks and component structures thereof including such hockey sticks and components having focused weight distribution.

BACKGROUND OF THE INVENTION

Hockey sticks are generally comprised of a blade portion and an elongated shaft portion. Traditionally, each portion was constructed of wood or a wood laminate and attached together at a permanent joint. These days many hockey sticks are constructed of engineered composite materials having either detachable or permanently attached blades. In these more contemporary constructions, the shaft is often times constructed by overlaying a mandrel of suitable dimension with plies of fibers and a resin to create an uncured shaft pre-form. The shaft pre-form is then cured by subjecting it together with the mandrel to heat which upon cooling results in the fibers being disposed in a hardened resin matrix. The mandrel is then removed by sliding it out of one end of the cured tubular shaft. The tubular composite shaft is often times further processed (painted, sanded etc.) and then either sold separately or mated to a detachable or permanently attached blade and sold as a complete hockey stick unit.

Similarly, contemporary composite hockey stick blades are typically constructed by wrapping multiple plies of fibers over one or more core elements to create a hockey stick blade pre-form. The blade pre-form is then placed within a mold where the resin, which is either pre-impregnated in the fiber plies or added via a resin transfer process, is cured. The curing process hardens the resin so that the fibers become disposed within a hardened resin matrix while the mold defines the exterior shape of the cured blade. Once molded and cured the blade may be further finished by deburring and perhaps with a coat of paint or exterior decals or the like and is then sold separately or as a hockey stick unit as previously described.

Typically the hockey stick blade is attached to the shaft via a "tennon" or "hosel" section, which is generally comprised of an upward extension of the blade from the heel and is dimensioned at its upper end to be slidably and snugly received within a generally rectangular lower tubular end of the shaft. Such hockey stick constructions and joints are disclosed in commonly owned U.S. Pat. Nos. 7,097,577 and 7,144,343 which are hereby incorporated by reference in its entirety. In addition to such four-plane lap joint connections, some composite hockey sticks employ connections in which the shaft and the blade are mated together in a tongue and groove type configuration located at the heel as is disclosed in commonly owned U.S. Pat. No. 7,097,577, which is also hereby incorporated by reference in its entirety.

Once cured, composite shafts and blades are typically not further processed other than in the way of exterior finishing steps like deburring, painting, decaling, assembly and perhaps in some cases applying a thin high-friction coating to the outer exterior of the shaft for purposes of enhancing the grip of the user. The weight distribution of the stick therefore is primarily determined by the fiber ply lay-up, the resin distribution, and in the case of the blade the core elements (typically a light heat expandable foam). The manner by which these materials are distributed along the shaft is primarily driven by structural concerns. For example, high impact areas may have additional plies of fibers. Shafts that are meant to have greater flexibility may have fewer plies or perhaps fewer plies oriented in a manner to stiffen the longitudinal flex of the shaft. While such constructions have found wide acceptance by hockey players world-wide, until now there has been little or no attention directed to positioning focused weight within discrete locations in the shaft and/or blade of a hockey stick.

SUMMARY OF THE INVENTION

The present invention relates to hockey sticks, their manufacture, configuration and component structures. Various aspects are set forth below.

One aspect is directed to composite hockey stick blades, such as those constructed of fibers disposed within a hardened resin matrix encapsulating one or more core elements such as a light foam, wherein the blade further includes a material of high density (e.g. metal) positioned internally within the blade. The high density material may be positioned at the heel region or other regions of the blade such as the mid section or toe region thereby creating a focused weight distribution within the blade. The dense material may take any form from particles to solid strips to ball bearings or pellets and may be encapsulated in one or more materials including for example a woven fiber sock or other suitable material. A polyurethane elastomer or some other suitable polymer or material may also encapsulate the dense material while also serving as a means to secure the dense material in the desired location within the blade.

Another aspect is directed to methods of making the focused weight hockey stick blade that include providing a cured composite blade that is constructed to include an internal pocket that extends through at least one external surface of the cured blade construct and positioning a high density material within the cured blade construct at the desired location. The process of positioning may including plugging the pocket, such as by a foam plug system. The method may also include filling a portion of the cavity with a suitable polymer such as polyurethane elastomer to further encapsulate and secure the position of the high dense material. The polymer may also serve as a vibration dampener and provide additional weight to the focused weight component.

Another aspect is directed to tubular composite hockey stick shafts, such as those constructed of fibers disposed within a hardened resin matrix, wherein a discrete region of the internal walls of the tubular shaft is coated with a material. The additional weight added by the coating results in a region of focused weight. While the coating may be applied anywhere along the longitudinal length of the shaft in continuous or discrete locations, it is contemplated that the coating be applied within the upper half of the shaft. The coating may be comprised of a variety of materials having suitable characteristics (e.g., adherence to the inner walls of the shaft, flexibility, durability, impact resistance, etc.). One such material is a thermoplastic adhesive having flexibility at low temperature.

Another aspect is directed to a method of making a focused weight tubular hockey stick shaft that includes coating an internal wall region of a tubular hockey shaft by inserting a suitably dimensioned coating plug into the upper end of a tubular hockey stick shaft and positioning the plug at the desired location where the coating is to be applied; adding a selected amount of coating material above the plug; applying heat; and allowing the coating plug to move upward along the shaft thereby applying the coating to the internal walls of the shaft. The movement of the coating plug up the shaft may be facilitated in part or in whole by gravity. The region coated in the shaft may be discretely located within the shaft. In the case of a composite shaft constructed of fibers disposed within a hardened resin matrix, it is contemplated that the coating be applied after the shaft is cured.

Yet another aspect is directed to hockey sticks having focused weight blades and/or shafts as described above and methods for making such hockey sticks. The stick may be a two part stick with a detachable blade or a blade that is permanently attached. The stick may have focused weight in both the shaft and the blade, only in the blade or only in the shaft. It is contemplated that approximately an equal amount of focused weight be added to the shaft as added to the blade. It is also contemplated that existing composite hockey stick shafts and blade constructs may be made lighter (using fewer plies in certain regions of the constructs) and the weight saved in lightening the construct be added back as focused weight as described above, such that the total weight of the shaft, blade or hockey stick remains the same or substantially the same as it did before.

Additional implementations, features, variations and advantageous of the invention will be set forth in the description that follows, and will be further evident form the illustrations set forth in the accompanying drawings.

BRIEF DESCRIPTION OF THE DRAWINGS

The accompanying drawings illustrate presently contemplated embodiments and constructions of the invention and, together with the description, serve to explain various principles of the invention.

FIG. 4A-D are drawings of a coating plug that may be used in applying the focused weight overlay coating on the internal surfaces of the walls that define the tubular hollow of the shaft. FIG. 4A is a perspective side view, FIG. 4B is a side (narrow) view, FIG. 4C is a side (wide) view, and FIG. 4D is a top view.

FIGS. 5-9 illustrate steps of a process for making a focused weight shaft such as that illustrated in FIG. 1 by applying a coating to the internal surfaces of a tubular shaft using a coating plug, such as that illustrated in FIGS. 4A-D.

DETAILED DESCRIPTION OF PREFERRED EMBODIMENTS

Figure 1:
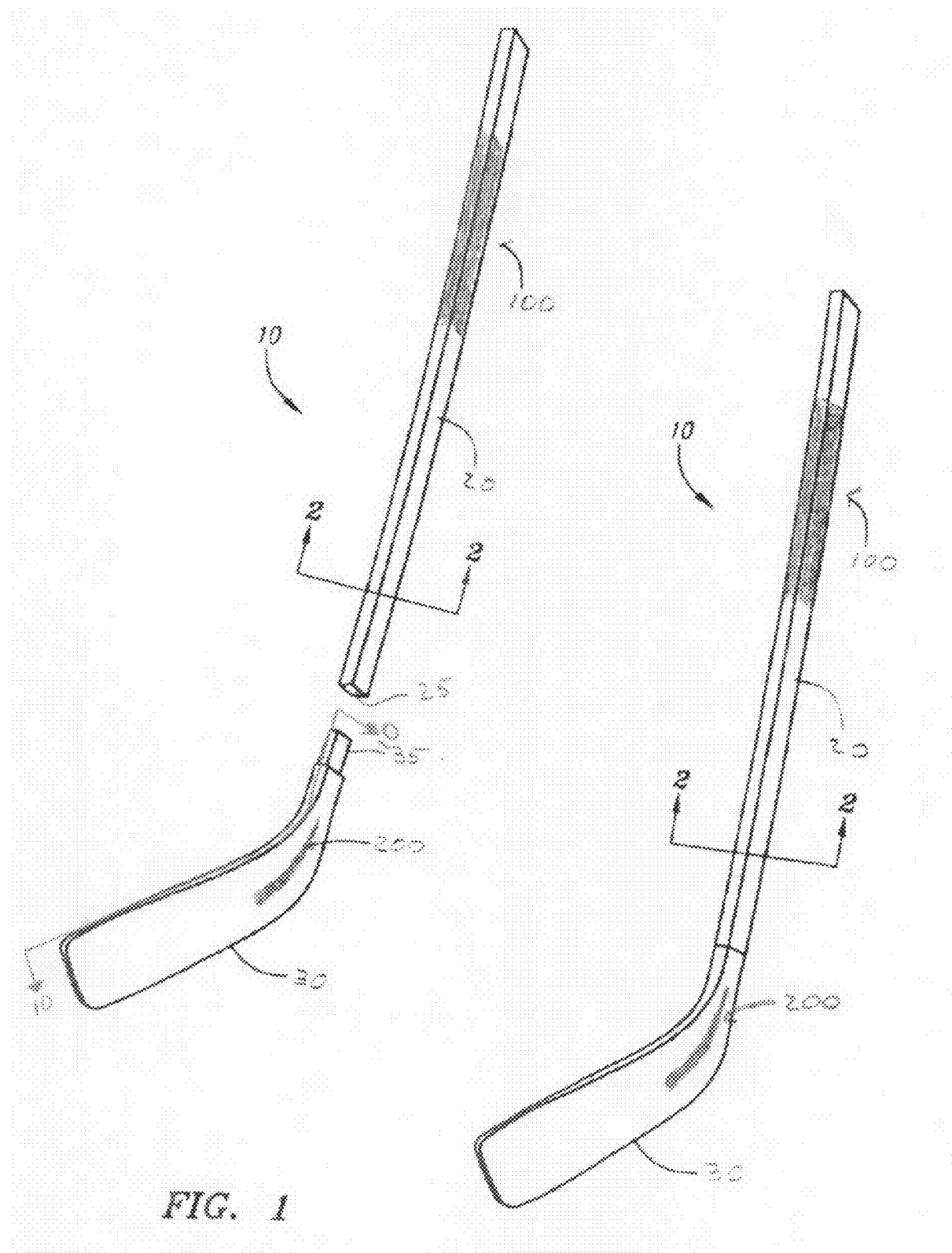
FIG. 1 is a perspective view diagram illustrating a representative two-piece composite hockey stick having a hollow tubular shaft and a replaceable composite blade including a connection member which is received within the socket of the shaft located at the lower-end of the shaft. The shaded regions on the shaft and blade denote internal regions having focused weight as described in more detail below.

Preferred embodiments will now be described with reference to the drawings. To facilitate description, any reference numeral designating an element in one figure will designate the same element if used in any other figure. The following description of preferred embodiments is only exemplary. The present invention is not limited to these embodiments, but may be realized by other implementations. Furthermore, in describing preferred embodiments, specific terminology is resorted to for the sake of clarity. However, the invention is not intended to be limited to the specific terms so selected, and it is to be understood that each specific term includes all equivalents.

FIG. 1 is a representative composite hockey stick 10 comprising a shaft 20 and a blade 30 and two regions of focused weight 100 and 200 residing in the shaft 20 and blade 30 respectively. The shaft 20 may be detachable from the blade 30 at its lower end as illustrated in FIG. 1 or may be permanently attached. The joint between the shaft 20 and blade 30 may be comprised of a suitably dimensioned connection member 35 located on the upper-end of the blade 30 (often referred to as a "hosel" or "tennon") that is received within a socket 25 of the lower end shaft 20 as shown in FIG. 1. It should be understood that any number of other connection types, including for example those disclosed in commonly owned U.S. Pat. Nos. 7,097,577 and 7,144,343 may be employed.

Figure 2:
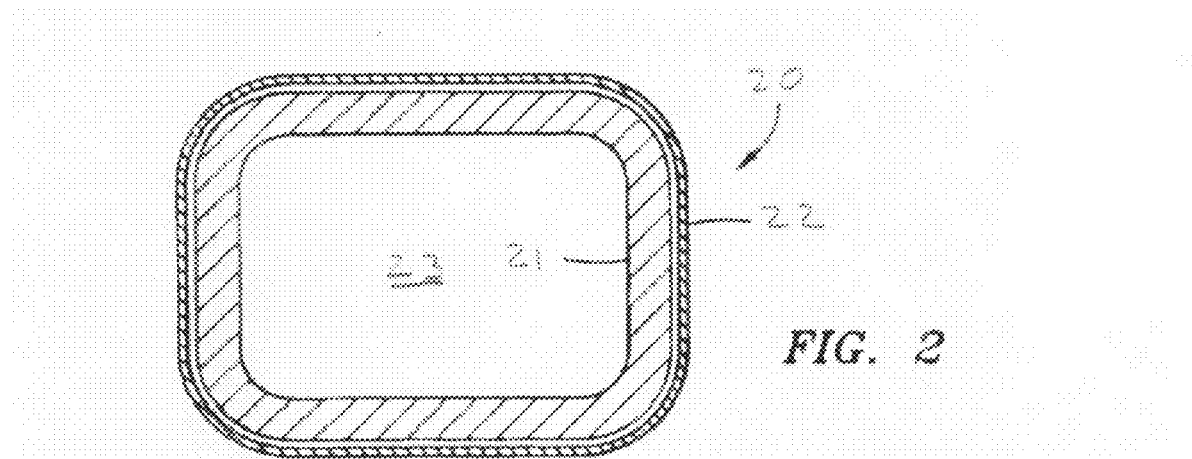
FIG. 2 is a cross-sectional view of the hockey stick shaft depicted in FIG. 1 taken along line 2—2, showing a contemporary composite shaft construction.

The shaft 20 is tubular and may be constructed of fibers disposed within a hardened resin matrix. The fibers may be aligned and oriented in defined directions with an outer layer often being a woven fiber. Various fibers may be employed including carbon, aramid (e.g., Kevlar™), boron, glass, etc. FIG. 2 is a cross-sectional view of the shaft 20 depicted in FIG. 1 and is illustrative of the construction of the shaft 20 including the aligned layers of fibers 21, the woven outer layer 22, and the tubular hollow 23 extending the length of the shaft 20. Typically composite shafts may be formed either (1) via wrapping plies over a mandrel and then curing as previously described in the background of this application or (2) via pull-trusion, a process that involves overlaying fibers around a mandrel that is then fed into a heating element to cure the resin. The pull-trusion method is typically automated as compared to the wrapping method. In addition, the pull-trusion method typically employs a uniformly dimensioned mandrel which results in a uniform shaft that does not vary in dimension along its longitudinal length. The wrapped construction method allows for variations along the shaft both in construction (e.g., ply lay-up at any given region of the shaft may be varied as needed) and internal and external dimension (e.g., a shaft typically has a tapered internal and external configuration as it extends toward the blade). Thus in a wrapped construction where the mandrel is tapered as it extends downward to the connection with the blade, the mandrel is typically removed from the upper-end (butt) of the shaft because the blade-end (tip) of the shaft is too narrow to allow the larger dimensioned upper regions of the mandrel to pass. While composite shafts have been described, it is also contemplated that the shaft 20 may be aluminum or other suitable metal or may be constructed of a combination of metal and fiber composite.

Figure 3:
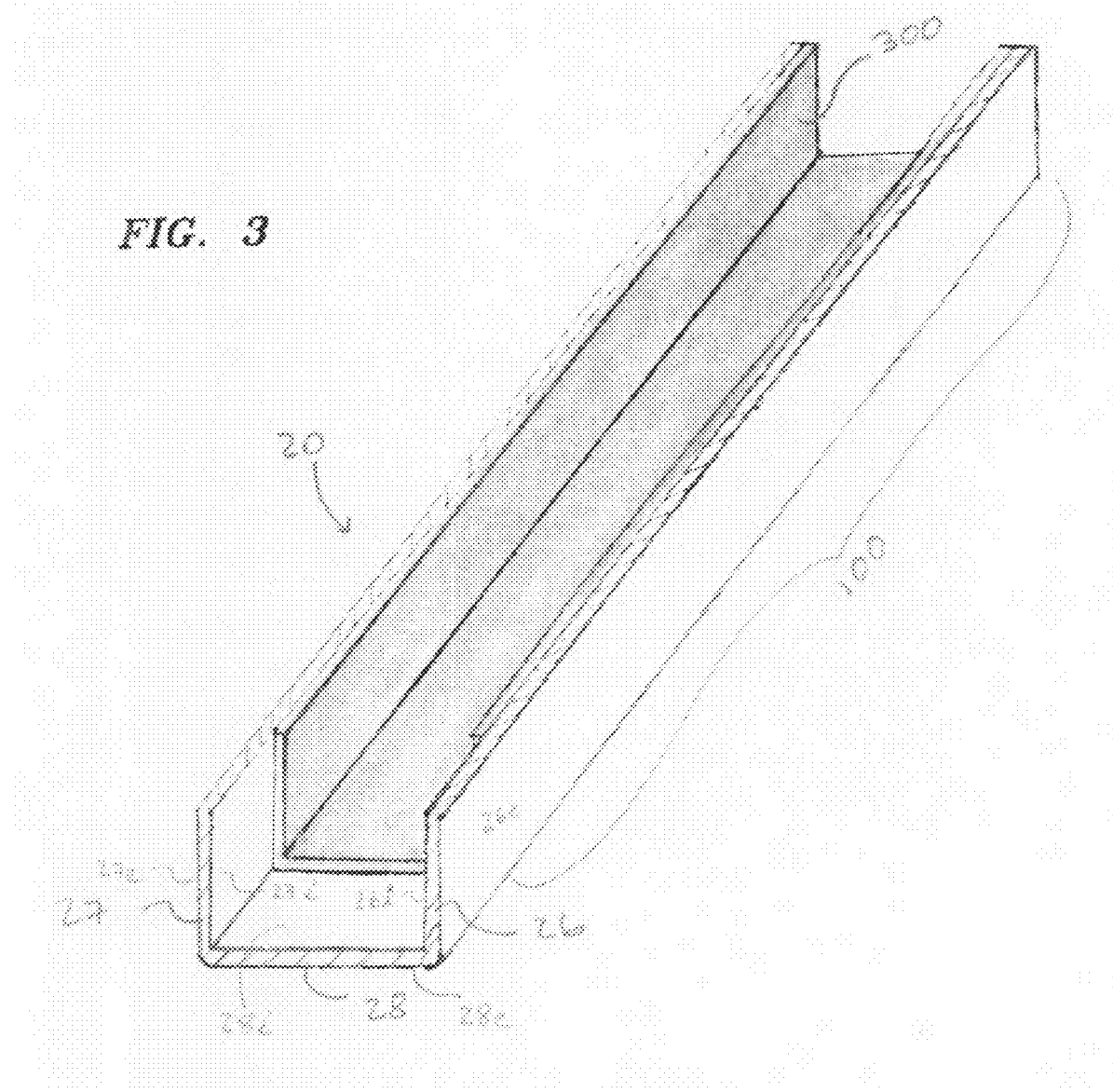
FIG. 3 is a partial perspective cross-section view of the shaft illustrated in FIG. 1 depicting in greater detail the internal region of shaft having a focused weight overlay coating on internal surfaces of the walls that define the tubular hollow of the shaft.

FIG. 3 is a partial perspective cross-section of the shaft illustrated in FIG. 1 depicting in greater detail the region of focused weight 100 of the shaft 20. As illustrated in FIG. 3 the shaft is tubular and is defined by narrow opposing walls 26 and 27 and wide opposing walls 28 and 29 (not depicted in FIG. 3) which together generally form a rectangular structure and define corresponding internal and external surfaces 26i, 26e, 27i, 27e, 28i, 28e, and 29i, 29e (not depicted in FIG. 3). Layered within the internal surface 26i, 27i, 28i, and 29i of the walls, 26, 27, 28 and 29 is a focused weight overlay coating 300 that extends longitudinally for a defined distance along the length of the shaft 20. The overlay coating 300 places additional weight in a discrete location along the length of the shaft and may function to dampen and/or resist sudden forces while also serving to more evenly balance the weight of the hockey stick as desired by the user.

It is contemplated that an existing shaft lay-up could be modified to lighten the overall weight of the shaft while retaining the desired strength. This could be accomplished via removing plies in certain regions of the shaft, varying the orientation of the fibers, and/or the selection fibers and/or resin. The weight saved by doing so could be added back to the shaft 20 as a focused weight overlay coating 300 so that the total shaft weight of lighter shaft (including focused weight overlay coating 300) would be the same or approximately the same as it had been (i.e., with the prior heavier lay-up and without the focused weight overlay coating 300 being added).

The overlay coating 300 may be comprised of a variety of materials having suitable characteristics (e.g., adherence to the inner walls of the shaft, flexibility, durability, impact resistance, etc.). The overlay may be comprised of a polymer, an adhesive, a plastic or a combination of softer and harder materials.

One such material is a thermoplastic adhesive such as that marketed by 3M under the Scotch-Weld™ hot melt bonding systems part number 3764. This particular thermoplastic adhesive is flexible at low temperature, has good impact resistance including at low temperature and bonds well to a variety of plastics including polycarbonate, polyethylene and polypropylene. The following is a listing of this particular product's properties:

| Color | Clear |
| --- | --- |
| FDA Listed Components | Y |
| UL 94 Listing | V2 |
| EC Temp Control Modules | 4 |
| Flash Point (° F./° C.) | 514/267 |
| Viscosity CPS | 6000 @375° F. |
| Delivery Time (sec) for 1" × 3" Cartridge** | 55 |
| Ball & Ring Soft Point (° F./° C.) | 190/88 |
| Heat Resistance (° F./° C.) | 140/60 |
| Impact Resistance (in.-lbs.) 72° F. (22° C.) | 58 |
| Peel Strength (PIW) 72° F. (22° C.) | 14 |
| Shear Strength PSI 72° F. (22° C.) | 390 |
| Tensile Strength PSI 72° F. (22° C.) | 650 |
| Elongation % | 625 |
| Bonding Range ⅛" Bead (sec) | 40 |
| Restrictions | None |
| Specific Gravity | 0.95 [ref. std. water = 1] |

The following are the ingredients of this particular thermoplastic adhesive product: (1) ethylene-vinyl acetate polymer (50-65% by weight); (2) hydrocarbon resin (25-35% by weight.); (3) polyethylene polymer (5-10% by weight); (4) polyolefin wax (1-5% by weight); and (5) antioxidant (0.5-1.5% by weight).

It is contemplated that the overlay coating 300 may be a mixture of a base coating and another more dense material such as small metallic or high density pellets to increase the aggregate density of the overlay coating 300. It is further contemplated for example, that carbon steel pellets having a diameter of 0.017 inches and a density of 7.8 g/cm$^3$ may be mixed with a base material (e.g., a thermoplastic adhesive) to create the overlay coating 300.

The overlay coating 300 may be applied to the shaft in the following manner. First, in the case of a composite shaft such as those described above, after the tubular shaft is cured and the mandrel is removed, a determination is made as to how much additional weight is desired to be added to the cured shaft. Second, a determination as to where the focused weight is to be positioned along the length of the shaft is made. Third, the overlay coating material is selected taking into account the weight being added and the position of the weight along the shaft. More dense materials may be selected when greater weight is required and/or when the region where the weight is being added is relatively compact. Fourth, the overlay coating 300 is applied to the internal surfaces of the walls of the shaft 20 in the desired region. It is contemplated that the overlay coating 300 may be applied to multiple regions of the shaft in discrete areas along one, two, three or all four walls 26, 27, 28, and 29 of the shaft 20.

One method of applying the coating to the internal surface regions of the tubular shaft 20 is to use a coating plug 500, such as that illustrated in FIG. 4A-D. Notably, the coating plug is dimensioned a defined amount less than the internal dimensions of the shaft so that it may pass through the hollow of the shaft 20 where the overlay coating material is to be applied and out the end of the shaft 20 once application of the coating has been completed. The difference between the dimension of the coating plug and the corresponding internal dimensions of the shaft determines the thickness of the coating. The coating plug 500 depicted in FIGS. 4A-D has a rectangular base 505 that is defined by two sets of opposing surfaces 510, 520, 530, 540 that extends upwardly into a rectangular cone portion 550. The coating plug 500 may be made of a variety of materials taking into consideration the properties of the coating material and the shaft being coating. It has been found that a coating plug 500 made of aluminum works well with the a thermoplastic adhesive coating material of the type described above in connection with coating a carbon fiber composite shaft. Other coating plug 500 configurations may be used for example it is contemplated that the base 505 and/or the cone portion 550 of the coating plug 500 may be elliptical, circular, square, trapezoidal or any combination thereof taking into account the desired thickness of the coating that is to be applied and the dimensions and configurations of the internal surfaces in which the coating is being applied. The dimensions noted in FIG. 4A-D are representative dimensions for applying a 0.22 inch thick overlay coating 300 on a generally rectangular shaft having internal dimensions of 0.626 inches×1.024 inches. The disparity between the coating thickness and the difference between the internal dimensions of the shaft and the external dimensions of the base of the plug is due to adhesion of the coating to the plug surface (i.e., there is an adhesion layer on the plug surface during the application process).

FIGS. 5-9 illustrate steps of a representative process for applying the coating to the internal surface regions of the tubular shaft 20 having a total longitudinal length L using a coating plug 500, such as that illustrated in FIGS. 4A-D. As illustrated in FIG. 5, the coating plug 500 is inserted into the butt-end of a vertically aligned tubular shaft 20 a defined distance L1 (in this representative process L1 is 23 inches). The coating plug 500 is attached to (e.g., hung on) a line 560 that can be made of any suitable materials such as a thin metal chain, wire, plastic etc. The line 560 may have one or more delineation markers at one or more defined positions or intervals along its length so that the coating plug 500 can be accurately positioned in the desired or defined location vis-à-vis the shaft 20.

Once the coating plug 500 is positioned in the desired location, a pre-defined amount of overlay coating material 570 (e.g., thermoplastic adhesive or perhaps a mixture of thermoplastic adhesive with carbon steel pellets as described above) is added into the hollow 23 of the shaft 20 so that it rests on top of the coating plug 500. This is illustrated in FIG. 6. The overlay coating material 570 may be in pellet or particle form as illustrated in FIG. 6 or some other form having suitable dimensions so that when inserted into the shaft it does not pass by the coating plug 500. When an aggregation of various pellet sizes are employed wherein at least some of which are small enough to pass between the sides of the coating plug 500, it may be useful for the pellets to be aggregated together so they have a large enough dimension to limit their passage. The aggregation of the varied size pellets may be facilitated by a suitable adhesive glue or similar material wherein the pellets will be stuck together before loading onto of the plug. Alternatively, it is contemplated that the load of the coating plug 500 be staged so that plug is first loaded with sufficiently sized material and then load the smaller particles or pellets on top of the larger particles or pellets, such that the larger pellets would serve to block the smaller pellets from passing by the coating plug 500. The cone portion 550 may function to bias the pellets radially outward from the center of the coating plug 500 so that they are substantially lodged between the upper regions of the cone portion 550 and the internal surfaces 26$i$, 27$i$, 28$i$, and 29$i$ of the shaft 20.

Figure 9:
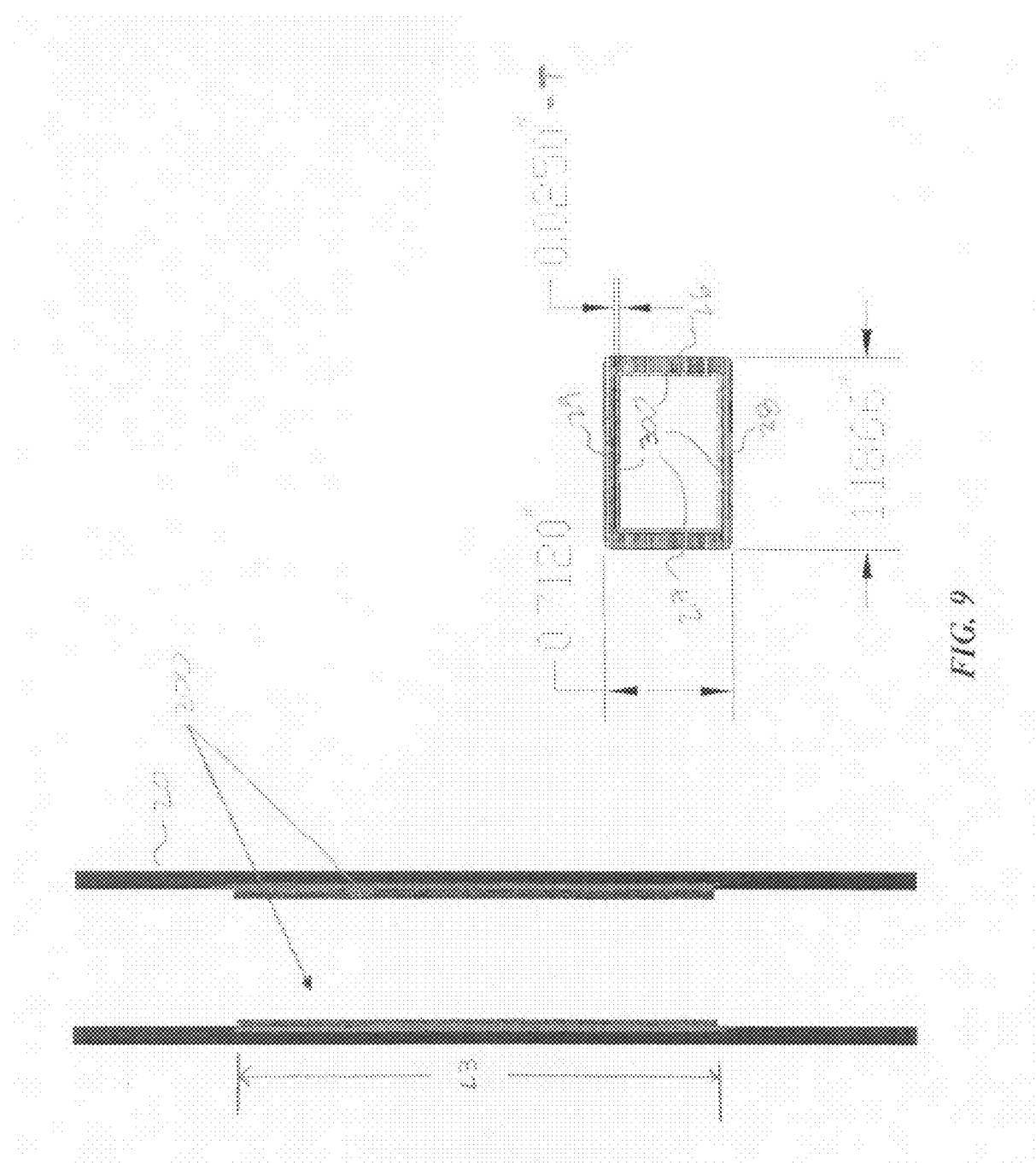

After loading the shaft 20 with the coating plug and material 500 and 570, the shaft 20 is then heated preferably while the shaft 20 stays in the upright or vertical position to prepare the coating material 570 for application. An appropriate temperature and time is selected to sufficiently soften the coating material to a suitable viscosity in preparation for application to internal walls of the shaft. In the case of the thermoplastic adhesive material described specifically above, placing the shaft (including plug loaded with coating material) in a preheated oven at 250° F. for approximately 15 minutes has been found sufficient to reduce the viscosity of the coating material such that it is capable of exhibiting suitable flow characteristics for application to the shaft wall. After heating the shaft 20 is hung a distance by the protruding line extending upwardly from the coating plug 500 as illustrated in FIGS. 6 and 7. It is preferable that shaft 20 be hung such that lower end of the shaft 20 or tip resides above the ground a distance greater than L3, which is the expected or calculated longitudinal length of the overlay coating 300. Once the shaft is hung a force such as gravity or some man made force, will pull the shaft downward away from the coating plug 500, the coating plug will slide-up along the inside of the shaft 20 and in the process apply the coating material 570 to the shaft 20, thereby creating the focused weight overlay coating 300 along the L3 region of the shaft 20. These steps are illustrated in FIGS. 7-9. The thickness T of the overlay coating 300 is dependent on the width dimensions between the base 505 of the coating plug 500 vis-à-vis the internal dimensions of the shaft 20 where the overlay coating is applied while the length of the coating L3 is also further dependent on the amount of coating material 570 loaded on top of the coating plug 500. Thus for example, in a shaft 20 having internal dimensions of 0.626×1.024 inches and a coating plug 500 having a corresponding base dimensions of 0.546×0.945 inches a 16 inch long (L3) overlay coating 300 of generally uniform thickness (T) of approximately 0.020 to 0.025 inches can be achieved on all four internal surfaces of the shaft 20 if approximately 15 grams of thermoplastic resin described above is used (in a shaft having a total weight of 301 gram shaft). It is contemplated that the focused weight overlay coating as a percentage of total shaft weight range broadly from 2% to 25%, preferably from 3% to 20%, even more preferably from 4% to 15%, and yet even more preferably from 5% to 10%.

Figure 10:
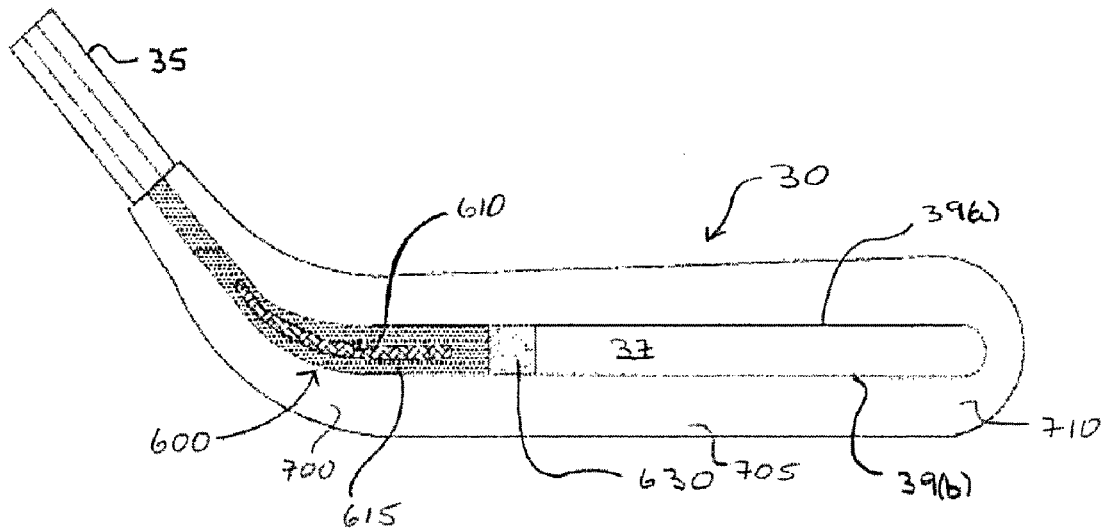
FIG. 10 is cross-sectional view of the blade separated from the shaft of FIG. 1 along line 10—10 illustrating the focused weight located within a pocket of a composite hockey stick blade.

FIG. 10 is cross-sectional view of the focused weight blade 30 separated from the shaft 20 of FIG. 1 along line 10-10. It illustrates the focused weight component 600 located within a cavity or pocket 37 of a cured composite hockey stick blade 30. The pocket 37 of the blade 30 is defined along its upper and lower borders by bridge structures 39$a$ and 39$b$ that extend the thickness of the blade 300 from the front to the back walls of the blade and are generally formed of fibers (e.g., aligned carbon fibers or the like) disposed in a hardened resin matrix. Although the focused weight component 600 may be formed of any suitable material, in the preferred embodiment, it is comprised of carbon steel balls 605 (illustrated in FIG. 18) housed within a braided e-glass woven sock 610 that is further encapsulated within a cavity filling material 615 such as a polyurethane elastomer material. A plug system 630 may be employed in connection with positioning the focused weight component 600 in the desired location in the pocket 37 of the blade 30. Although the focused weight component 600 in the illustrated embodiment is located generally along the center line of the blade 30 and generally at the heel region 700 of the blade 30, it is contemplated that some or all of the focused weight component 600 may be positioned below the centerline and/or above the centerline. In addition it is contemplated that some or all of the focused weight component 600 may be positioned in regions other than the heel 700, such as the mid-section 705 or the toe section 710 of the blade 30. Further it should be understood that while a single focused weight component 600 is illustrated, it is contemplated that multiple focused weight components 600 may be employed in different positions along the length and/or height of the blade 30 and that such focused weight components may be varied in weight. For example it is contemplated that one focused weight component 600 may be positioned low (near the ice) while another in the same blade may be positioned above the first component and that the lower component be heavier than the higher component or vice-a-versa. It is also contemplated that multiple focused weight components 600 be positioned along the length of the blade 30 either immediately adjacent to each other or longitudinally spaced a defined distance. FIGS. 11-20 illustrate steps of a representative process for making a focused weight blade such as that illustrated in FIG. 1 and FIG. 10. Each of these steps are discussed in turn below.

Figure 11:
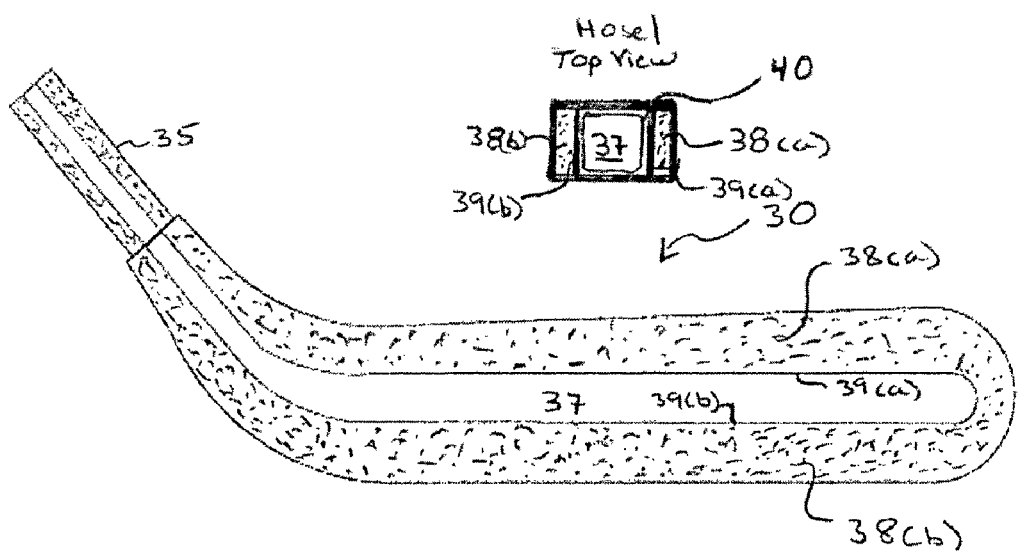
FIGS. 11-20 illustrate steps of a process for making a focused weight blade such as that illustrated in FIG. 1 and FIG. 10.

FIG. 11 depicts a cured composite hockey stick blade 30 having a cavity or pocket 35 that extends longitudinally from the toe of the blade 30 and opens up at to the end of the hosel or tennon 35. In application, such a blade 30 can be made via a process that generally involves the following steps. First foam pre-forms generally having an upper and lower component are wrapped with plies of fibers disposed in an unhardened resin in a desired lay-up. The foam pre-forms can be made of pvc foam or any other suitable material capable of bonding with the resin/fiber while providing a suitable durability for the core of the composite sandwich structure. Together, the upper and lower foam pre-forms are generally in the form of a hockey stick blade 30. A plastic bladder is then inserted between the wrapped upper and lower foam-preforms and then the entire construct is further wrapped within additional plies of fibers such that the plastic bladder is encapsulated within plies of fibers. Using epoxy based pre-impregnated plies of fibers, such as 34/700 manufactured by Grafil, Inc. works well in that the adhesive properties of the plies can serve to keep the pre-form structure together as it is being constructed. A suitable plastic bladder material includes nylon bladder made by Airtech International. Once all the plies are layered over the foam pre-forms and bladder the entire construct is placed within a female mold having the desired exterior shape of the blade and is cured via application of heat for an appropriate time and temperature. The plastic bladder 40 is positioned such that the end of the plastic bladder extends out the hosel of the blade pre-form and prior to curing is connected to a nozzle that channels pressurized air into the bladder while the blade is being cured. The pressurized air within the bladder serves to provide internal pressure that assists in ensuring that the plies of fibers are tightly compacted and that the blade pre-form takes on an accurate rendition of the mold as it is cured. Once cured, as depicted in FIG. 11, the blade 30 includes foam core elements 38(a) and 38(b) encapsulated by plies of fibers disposed in a hardened resin matrix material and vertically partitioned by an air cavity or pocket 37 that extends internally within the blade 30 from generally the toe section 710 to the end of the hosel where it opens-up to create an externally accessible channel at the end of the hosel as depicted in the top view of the hosel in FIG. 11.

Figure 12:
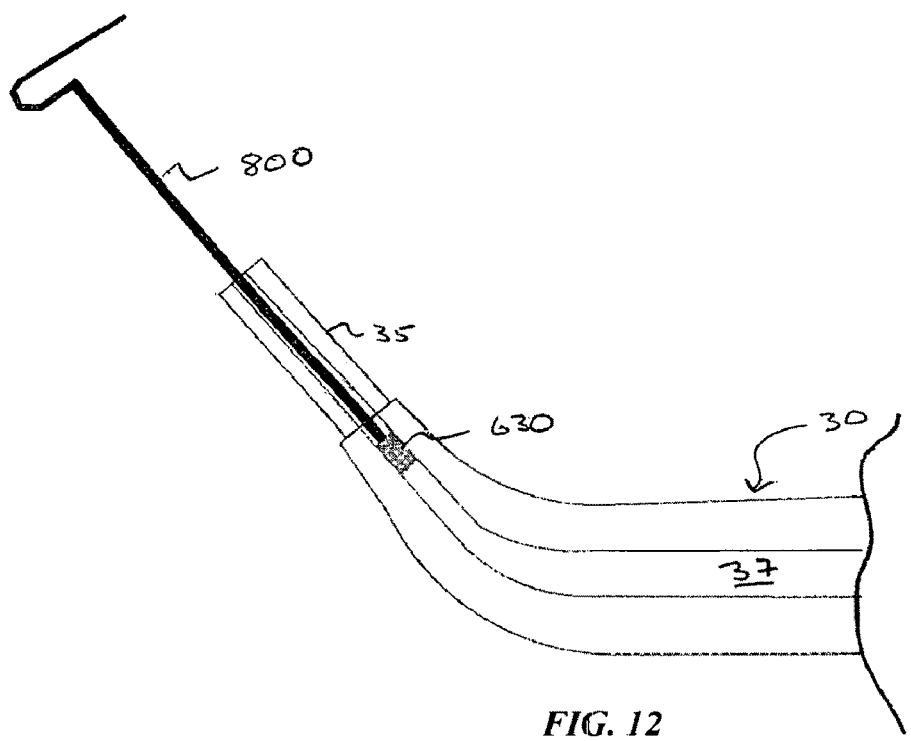
Figure 13:
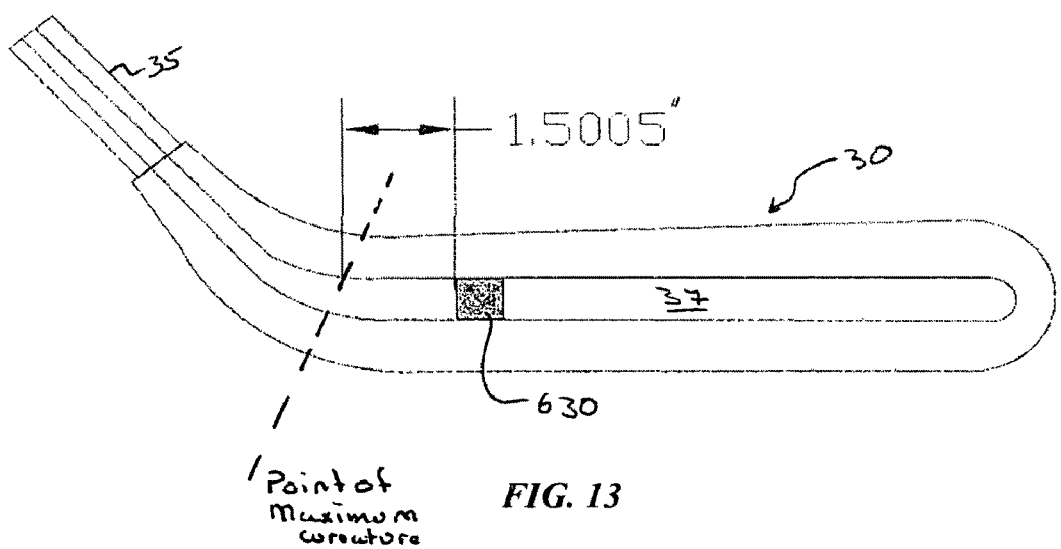

As illustrated in FIGS. 12-13, once the blade 30 is cured a plug system 630 is inserted into the cavity 37 through the channel in the hosel and is positioned in the desired location within the blade 30. A positioning rod 800 of fixed length or having demarcations reflective of its length or position relative to the blade may be used for this purpose to ensure that the plug system 630 is positioned accurate and consistently each time. The positioning rod 800 may be made of any suitable material such as a polymer or a metal or a resilient material that is capable of passing through a curved passageway.

Figure 14:
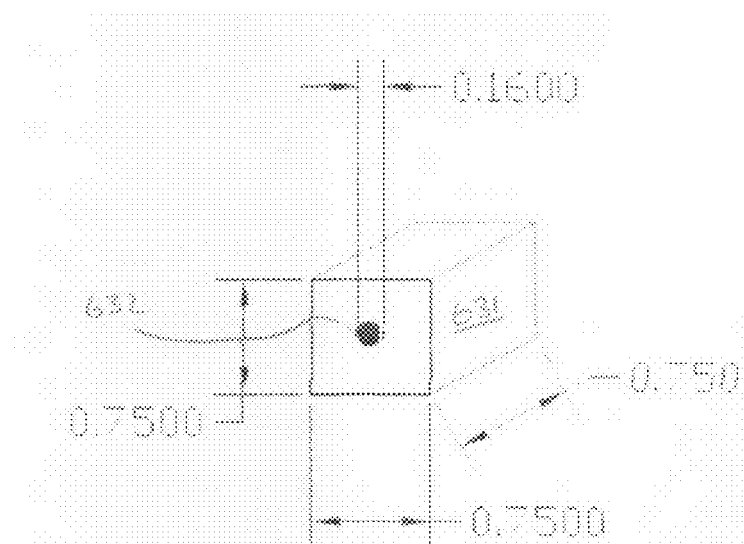
Figure 15:
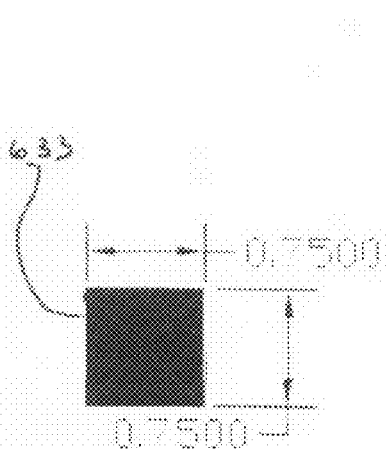
Figure 16:
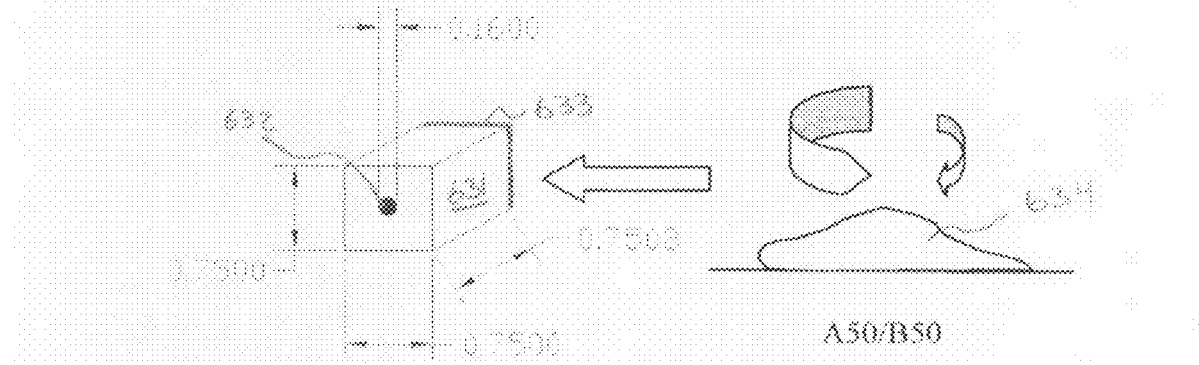
Figure 17:
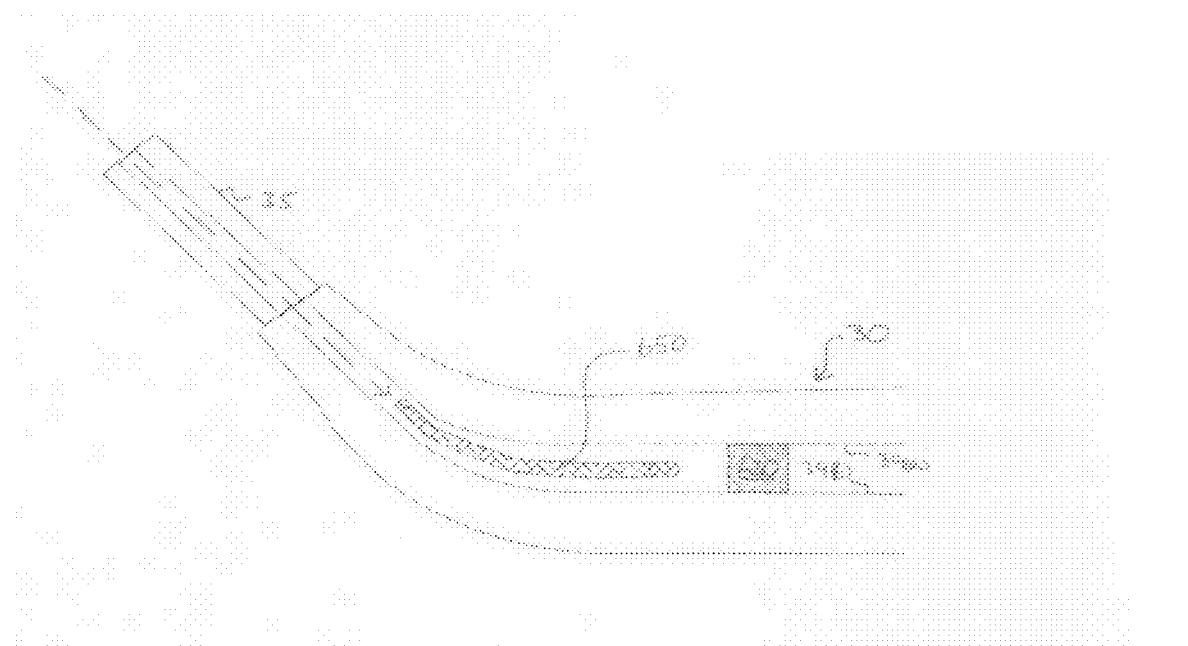

FIGS. 14-16 illustrate in more detail the components of the illustrated plug system 630. The plug system 630 is comprised of three components, a flexible foam element 631 that has a hole or passage 632 extending through its center to receive the positioning rod 800. Foam element may be made of any suitable material, such as open cell flexible polyurethane foam marketed under the HR 2533Y product number by Kenth Landsberg Company. The foam element 631 is dimensioned such that it is capable of filling or substantially filling the cavity region in which it is positioned. The flexibility of the foam allows it to be manipulated through the a less than uniform cavity 37 yet once positioned the natural bias of the foam element 631 expands outward to fill the cavity 37. In order to provide a firm substrate by which the positioning rod 800 may press on when its is pushing the flexible foam element 631 through the cavity to the desired position a suitable backing material 633 may be employed. For example, high temperature resistant tape (such as that marketed as "Permacel Hi") may be stuck to the end of the foam element 631 to block one end of the passage 632. When the positioning rod 800 is inserted into the open end of the passage 632 it would then press against the tape backing material 633. Thus rather than the positioning rod 800 pushing the flexible foam element 631 through the blade cavity to the desired location, the positioning rod 800 pushes the more resilient tape backing material 633, which in turn pulls the flexible foam element 631 through the blade cavity 37 to the desired location. FIG. 14 illustrates a flexible foam element 631 in a form of a cube, however any shape may be employed that is suitable for the function and in consideration of the dimensions of the cavity in the blade 30. FIG. 15 is an illustration of the backing material 633 with corresponding dimensions to the foam element 631 depicted in FIG. 14.

Just prior to insertion of the foam element 631 into the cavity of the blade 30, the foam element 631 and backing material 633 are dipped in or coated with a liquid foam material 634, which upon expansion serves to firmly lodge the plug within the cavity of the blade 30 at the desired location. This step is illustrated in FIG. 16. It is has been found that a suitable material is a two part (A and B) liquid foam made by Innovative Polymer Systems distributed by Diversified Materials Company under part # 3001-8 SLOW. Other suitable materials or methods may be used for this function (i.e., a mechanical stop within the cavity of the blade) including PVC foam (dip into acetone to soften and then insert into cavity) and other expandable or compressible materials. The use of expanding liquid foam 634 however is particularly effective in that once its expands from its two part liquid phase into a hardened/firm foam it takes the form of the inherent variations in the contour of the surrounding cavity 37 which further assist in securing the plug in the desired location. In addition, because it can be inserted into the blade cavity 37 prior to expansion it can pass easily through the cavity channels of the blade while in liquid form. Lastly, the liquid foam 634 (as well as the flexible foam element 631 and the backing material 633) has a relatively low density after expansion and thus does not add substantial weight to the blade 30.

Once the plug system 630 is installed, a high density material or component 650 is inserted into the blade cavity 37. The plug system 630 serves to block the high density material/component from movement toward the tip of the blade thereby control its position. Additional plug systems can be used in positioning multiple high density material/components 650. While it is contemplated that any suitable material may be used, the illustrated embodiment employs a high density component that is comprised of steel balls 605 housed within a woven E-glass sock 610. High density in this context refers to the relative density of the material or component vis-à-vis the surrounding blade structural components. The addition of a high density component serves to focus the weight distribution to the region in which it is positioned. It is contemplated that the additional weight added by the focused weight component 600 and the plug system 630 may be offset by corresponding reductions in the weight of the blade via for example removal of plies in certain regions of the shaft, varying the orientation of the fibers, and/or the selection fibers, core elements, and/or resin. Thus, it is contemplated that an existing blade construction may be modified to lighten the weight of the blade so that when the focused weight component 600 is added the overall weight of the blade 30 remains substantially or approximately the same.

Figure 18:
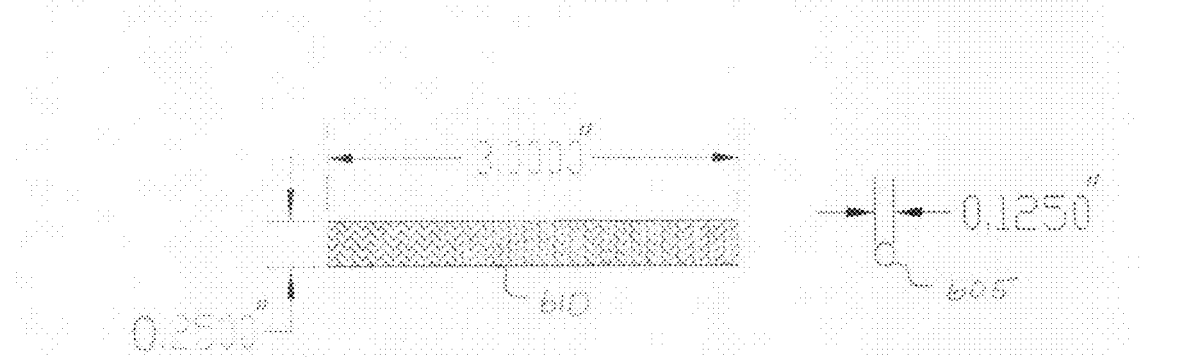
Figure 19:
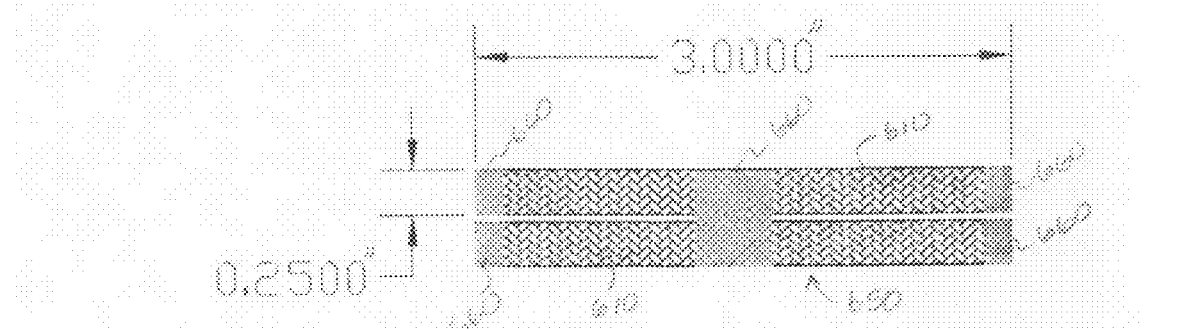

FIGS. 18-19 illustrate a representative high density component having woven E-glass sock 610 and steel balls 605 and the steps employed to construct this component. While an E-glass sock is described any suitably dimensioned sock may be employed. Hence it is contemplated that a flexible durable polymer bag or sock may be employed a or a woven fiber sock made from another fiber such as carbon or aramid fiber may be employed. However, the function of the sock is to encapsulate the steel balls 605 and thus it is preferable that a durable resilient material be employed that can withstand the impacts and blade flex that go hand-in-hand with the energetic rigors of competitive hockey, even when such events result in fracture of the blade. The metal balls 605 are loaded into the sock 610 and the sock is sealed using a suitable materials such as a tape or hot melt glue 660. A single sock 610 may be used or multiple socks may be used. When multiple socks 610 are used the socks may be coupled together before insertion via any suitable means such as an adhesive tape or glue 660 or mechanically via wire or a suitable thread. When a single sock is used the ends of the sock may be coupled together to create a loop. The length and dimension of the sock and metal balls are interdependent on one another and are driven by the desired weight that is sought to be added to the blade 30. The metal balls 605 are sized to fit within the sock. They can be placed within the sock in any order, however, a single line of metal balls 605 touching or in close proximity to one another has been found suitable. It has been found that suitable steel balls include ⅛" ABCO carbon steel balls sold by Abbott Ball Company having a density of 7.8 grams/cm³ and a total weight per ball of 0.131 grams. It has also been found that a 0.250" E-glass braided sock sold by A&P technology is also suitable for housing the ABCO balls. Loading 34 balls into two 3 inch socks or one 6 inch sock in a single file line results in a total weight of approximately 5.3 grams (comprising balls, sock and glue). Of course the amount of weight added to the blade can be adjusted to suit the particular needs of the user and the overall weight distribution of the hockey stick including the shaft 20.

Figure 20:
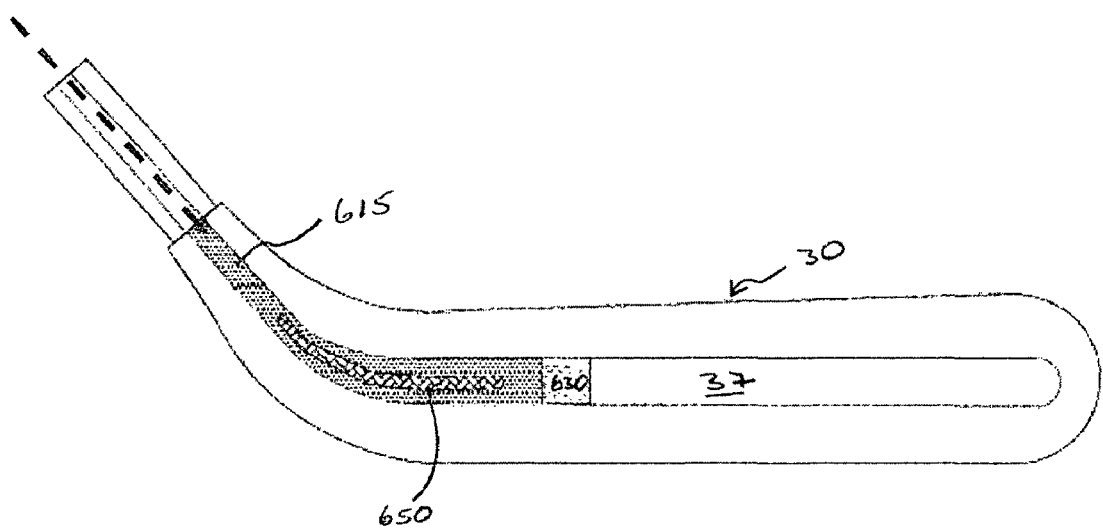

Turning to FIG. 20, once the high density material or component 650 is inserted into the blade cavity 37, a cavity filling material 615 may be added into the cavity 37 to further encapsulate and insulate the high density component as depicted in FIG. 20. The cavity filling material may be comprised of any suitable material that is capable of filling the cavity while encasing all or at least a portion of the high density component 650. The material may be selected for its dampening, adhesion, or other properties, specific gravity, strength, hardness, shrinkage etc. One material that works well with a high density component 650 comprising the E-glass woven sock 610 and carbon steel balls 605 is a polyurethane elastomer, such as that marketed by BJB enterprises under F-42 A/B (50/50) having a specific gravity of approximately 1.07 g/cc, a Shore A hardness of 42, a tensile strength of 735 psi (ASTM D-412), an elongation % of 1,080 (ASTM D-412), a tear strength of 65 pli (psi) (ASTM dO624) and linear shrinkage of 0.005 in/in (ASTM D-2566). In application the polyurethane elastomer has two parts that are mixed together in measured amounts (desired weight) and then poured into the cavity 37 of the blade through the channel that extends through the hosel of the blade. After a few minutes the polyurethane elastomer hardens thereby firmly securing the high density component within the cavity of the blade 30. It is contemplated that for the above example in which 34 carbon steel balls are loaded into a woven sock that approximately 10 grams of polyurethane elastomer may be used for a total added weight of approximately 15 grams.

As a general proposition, a hockey puck gains its velocity and direction as a result of impact mechanism with the blade as it is maneuvered by a hockey player. The impact mechanism is a complex phenomena, e.g. involving transfer of energy via elastic plastic deformation on the puck, blade, and shaft. The end condition of the puck (e.g., its velocity and trajectory), primarily depends on this impact mechanism. The blade's center of gravity, its stiffness distribution and curvature, among others, are all important. The addition of regions of focused weight in the blade at one or more strategic location(s) allows customization of the impact mechanism thereby tailoring the characteristic of the puck lunching condition. This is particularly true when the focused weight is added to the heel region of the blade. The heel region of the blade is generally more stiff than the toe region in that the toe is generally significantly thinner than the heel area. The heel region also resides between the majority of the blade face and the shaft where the players hands are in contact. Thus, forces on the blade generally pass through the heel before they reach the players hands. The heel region is also generally the region in which high impact shots are taken. Thus, the heel region is particularly suitable for positioning the focus weight, in that its position is suitable for curtailing/dampening unwanted vibration while also proximal to the regions where high impact shots are taken.

It is contemplated that the focused weight component 600 as a percentage of total blade weight range broadly from 2% to 35%, preferably from 5% to 25%, even more preferably from 7.5% to 20%, and yet even more preferably from 10% to 15%. Typical composite blades range from 90 grams to 250 grams for skaters and well over 300 grams for goalie sticks.

While there has been illustrated and described what are presently considered to be preferred embodiments and features of the present invention, it will be understood by those skilled in the art that various changes and modifications may be made, and equivalents may be substituted for elements thereof, without departing from the scope of the invention. For example, it is contemplated that access to the blade cavity may be through any surface not just the end of the hosel. It is contemplated that connection joint of the blade and the shaft be different than that illustrated in the drawings. It is contemplated that shaft be aluminum or some other tubular structure that includes a focused weight overlay. It is contemplated that the both the shaft and blade include focused weight regions or alternatively on the blade or only the shaft. It is contemplated that the blade and the shaft have the same or approximately the same amount of focused weight added to them or that they be different (i.e., the shaft has more weight added than the blade or vice-a-versa). It is contemplated, that the blade and shaft be sold separately or sold as a hockey stick. It is contemplated that the connection between the shaft and blade be facilitated by an intermediate connection member and that focused weight may be added to that connection member. It is contemplated that the focused weight component be added externally to the shaft and/or blade.

In addition, many modifications may be made to adapt particular element, feature or implementation to the teachings and of the present invention without departing from the central scope of the invention. Therefore, it is intend that this invention not be limited to the particular embodiments disclosed herein, but that the invention include all embodiments falling within the scope of the appended claims. Thus, it should be understood that various aspects of the teachings and principles disclosed herein relate to configuration of the blades and hockey sticks and components elements thereof. Other aspects relate to internal construction of the component elements and the materials employed in their construction and the methods of their manufacture and assembly. Yet other aspects relate to the combination of the foregoing aspects. The combination of one, more than one, or the totality of these aspects defines the scope of the invention disclosed herein. No other limitations are placed on the scope of the invention set forth in this disclosure. Accordingly, what is disclosed as inventive herein is only limited by the scope of this disclosure that supports or otherwise provides a basis (expressly, impliedly or inherently) for patentability over the prior art. Thus, it is contemplated that various component elements, teachings and principles disclosed herein provide multiple independent basis for patentability. Hence no restriction should be placed on any patentable elements, teachings, or principles disclosed herein or combinations thereof, other than those that exist in the prior art.

What is claimed:
1. A method of manufacturing a focused weighted composite hockey stick blade comprising the steps of:
   a. providing a cured composite hockey stick blade having a cavity that includes a passage through an outer surface of the cured blade; and
   b. filling said cavity, at least partially, with a component of relatively higher density than the surrounding regions of the blade, wherein the passage of the cavity extends through a connection member adapted at a region to be received within a tubular shaft;

wherein said cured composite hockey stick blade is formed of one or more core elements encased within one or more walls formed of one or more layers of directionally oriented fibers disposed within a hardened resin matrix.

2. The method of claim 1, wherein said component is comprised of metal balls housed within a sock.

3. The method of claim 2, wherein the step of filling further includes inserting said metal balls housed within said sock into the cavity and then adding a polymer material to further encapsulate said sock and metal balls.

4. The method of claim 3, further comprising inserting a plug system within the cavity.

5. The method of claim 4, wherein the plug system includes a liquid foam component.

6. The method of claim 4, wherein the plug system includes a flexible foam element.

7. The method of claim 4, wherein the plug system is inserted through the passage that extends through the connection member.

8. The method of claim 4, wherein the cured composite hockey stick blade comprises aligned fibers in defined orientations disposed in hardened resin matrix that define the external surfaces of the blade.

9. The method of claim 8, wherein said cavity is defined by said fibers disposed within said hardened resin matrix.

10. The method of claim 1, wherein the step of providing a cured composite hockey stick blade includes making the cavity within the cured blade using an air bladder.

11. The method of claim 1, wherein the cavity is defined at least in part by one or more bridge structures extending from the front to the back of the blade.

12. The method of claim 11 wherein the bridge structures are formed of fibers disposed in a hardened resin matrix.

13. The method of claim 1 wherein the cured composite hockey stick blade includes a first foam core element and a second foam core element separated at least in part by the cavity.

14. The method of claim 4, wherein the plug system is inserted using a positioning rod that moves one or more of the components of the plug into the desired location within the cavity.

15. The method of claim 1 further comprising the step of filling said cavity with a second component of relatively higher density that the surrounding regions of the blade.

16. The method of claim 1 wherein said component is positioned in the cavity within the heel region of the blade.

17. The method of claim 1 further comprising the step of adjusting the weight of the component to the particular needs of the user.

18. The method of claim 3, wherein the polymer material is an elastomer material.

* * * * *